(12) United States Patent
Winzinger et al.

(10) Patent No.: US 11,053,082 B2
(45) Date of Patent: Jul. 6, 2021

(54) METHOD AND APPARATUS FOR HANDLING PIECE GOODS MOVED ONE AFTER THE OTHER IN AT LEAST ONE ROW

(71) Applicant: KRONES Aktiengesellschaft, Neutraubling (DE)

(72) Inventors: Frank Winzinger, Regensburg (DE); Johannes Kirzinger, Unterhaching (DE); Manuel Kollmuss, Raubling (DE)

(73) Assignee: KRONES Aktiengesellschaft, Neutraubling (DE)

( * ) Notice: Subject to any disclaimer, the term of this patent is extended or adjusted under 35 U.S.C. 154(b) by 191 days.

(21) Appl. No.: 16/310,124

(22) PCT Filed: Feb. 21, 2017

(86) PCT No.: PCT/EP2017/053873
§ 371 (c)(1),
(2) Date: Dec. 14, 2018

(87) PCT Pub. No.: WO2017/220215
PCT Pub. Date: Dec. 28, 2017

(65) Prior Publication Data
US 2019/0144211 A1    May 16, 2019

(30) Foreign Application Priority Data
Jun. 23, 2016   (DE) .................... 10 2016 111 539.8

(51) Int. Cl.
*B65G 47/08*   (2006.01)
*B65G 43/00*   (2006.01)

(52) U.S. Cl.
CPC .......... *B65G 47/086* (2013.01); *B65G 43/00* (2013.01); *B65G 2203/041* (2013.01)

(58) Field of Classification Search
CPC . B65G 47/086; B65G 43/00; B65G 2203/041
(Continued)

(56) References Cited

U.S. PATENT DOCUMENTS 5,123,231 A    6/1992  Fallas et al.
5,867,897 A *  2/1999  Mimura ............. H05K 13/0413
                                                         29/840
(Continued)

FOREIGN PATENT DOCUMENTS

DE    3414248 A1    10/1985
DE    4329179 A1    3/1995
(Continued)

OTHER PUBLICATIONS

PCT-Application: PCT/EP2017/053873 dated Feb. 21, 2017—International Search Report dated May 30, 2017.
(Continued)

*Primary Examiner* — Michael Collins
(74) *Attorney, Agent, or Firm* — Simmons Perrine Moyer Bergman PLC

(57) ABSTRACT

The invention relates to a method and an apparatus for handling piece goods (2) moved one after another being transported to a seizing range (4) of at least one manipulator (5). Hereby at least two transported piece goods (2) are seized, spatially separated from the closed formation (F) and brought into a specified relative first target position (P1) and/or target alignment in relation to the subsequent piece goods (2). There at least one of the piece goods (2) is released. The at least one second piece good (2) seized from the formation (F) is seized again and is brought into a specified relative second target position and/or target alignment that is spaced apart from the first target position (P1).

10 Claims, 19 Drawing Sheets

(58) Field of Classification Search
USPC .................................................. 700/213–230
See application file for complete search history.

(56) References Cited

U.S. PATENT DOCUMENTS

| | | | |
|---|---|---|---|
| 6,325,591 B1 | 12/2001 | Focke et al. | |
| 7,185,751 B2 | 3/2007 | Guidetti | |
| 7,783,377 B2* | 8/2010 | Harris | H01L 21/68742 700/218 |
| 7,844,328 B2 | 11/2010 | Nemoto | |
| 8,448,411 B2 | 5/2013 | Hartl et al. | |
| 8,777,552 B2 | 7/2014 | Ward et al. | |
| 8,903,541 B2* | 12/2014 | Vangilbergen | H05K 13/089 700/217 |
| 9,387,992 B2 | 7/2016 | Boschi et al. | |
| 9,604,792 B2 | 3/2017 | Wipf | |
| 9,669,550 B2* | 6/2017 | Accou | B25J 15/0625 |
| 10,322,833 B2 | 6/2019 | Huffer et al. | |
| 10,882,702 B2* | 1/2021 | Kirzinger | B65G 47/086 |
| 2002/0002422 A1* | 1/2002 | Kondo | H01L 21/67259 700/228 |
| 2005/0246056 A1 | 11/2005 | Marks et al. | |
| 2006/0000086 A1* | 1/2006 | Takemura | H05K 13/0812 29/833 |
| 2006/0075631 A1* | 4/2006 | Case | H05K 13/0812 29/709 |
| 2011/0295414 A1* | 12/2011 | Lambert | H05K 13/021 700/217 |
| 2012/0197432 A1* | 8/2012 | Vangilbergen | H05K 13/021 700/217 |

FOREIGN PATENT DOCUMENTS

| | | |
|---|---|---|
| DE | 102009043970 A1 | 3/2011 |
| DE | 102010020847 A1 | 11/2011 |
| DE | 102010047615 A1 | 4/2012 |
| DE | 102011080812 A1 | 2/2013 |
| DE | 102011087045 A1 | 5/2013 |
| DE | 102013206125 A1 | 10/2014 |
| DE | 102013106004 A1 | 12/2014 |
| DE | 102016202182 A1 | 8/2017 |
| DE | 102016206667 A1 | 10/2017 |
| EP | 1456101 A1 | 9/2004 |
| EP | 1927559 A1 | 6/2008 |
| EP | 2107018 A1 | 10/2009 |
| EP | 2246277 A2 | 11/2010 |
| EP | 3205609 A1 | 8/2017 |
| FR | 2993870 A1 | 1/2014 |
| WO | 2017182161 A1 | 10/2017 |

OTHER PUBLICATIONS

PCT-Application: PCT/EP2017/053873 dated Feb. 21, 2017—ISR Written Opinion dated May 30, 2017.
German Application DE 10 2016 111 539.8 filed Jun. 23, 2016—German Search Report dated Jan. 10, 2019.
International Application: PCT/EP20171053873 filed Feb. 21, 2017—International Report on Patentability dated Jan. 3, 2019.
Chinese First Office Action dated Feb. 6, 2020.

* cited by examiner

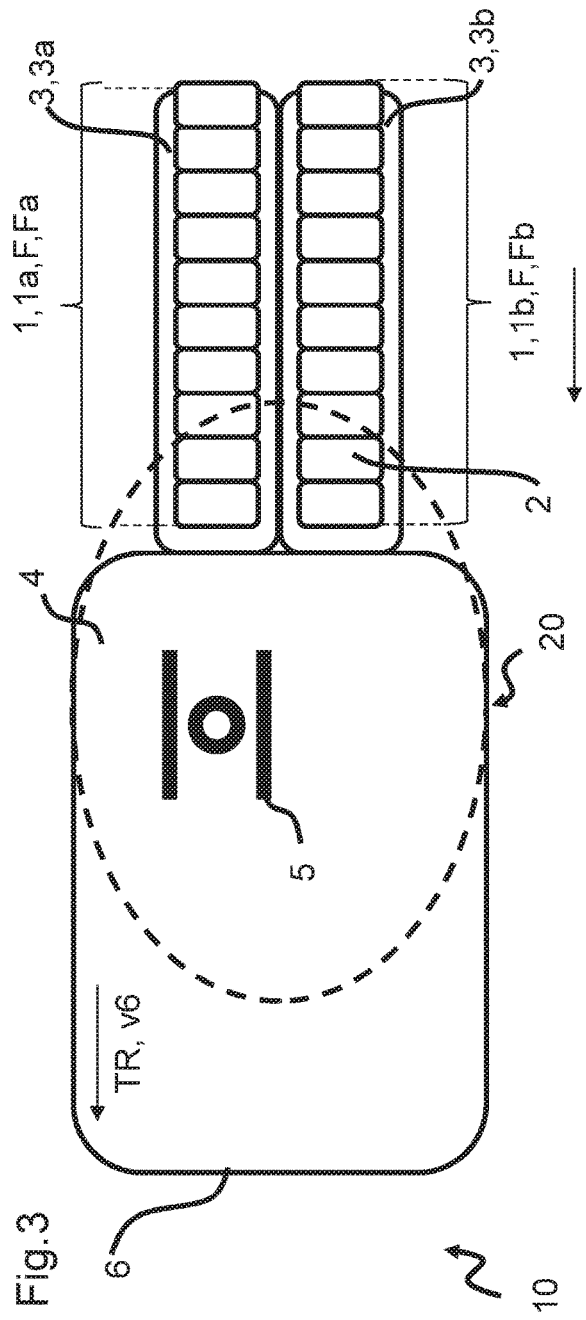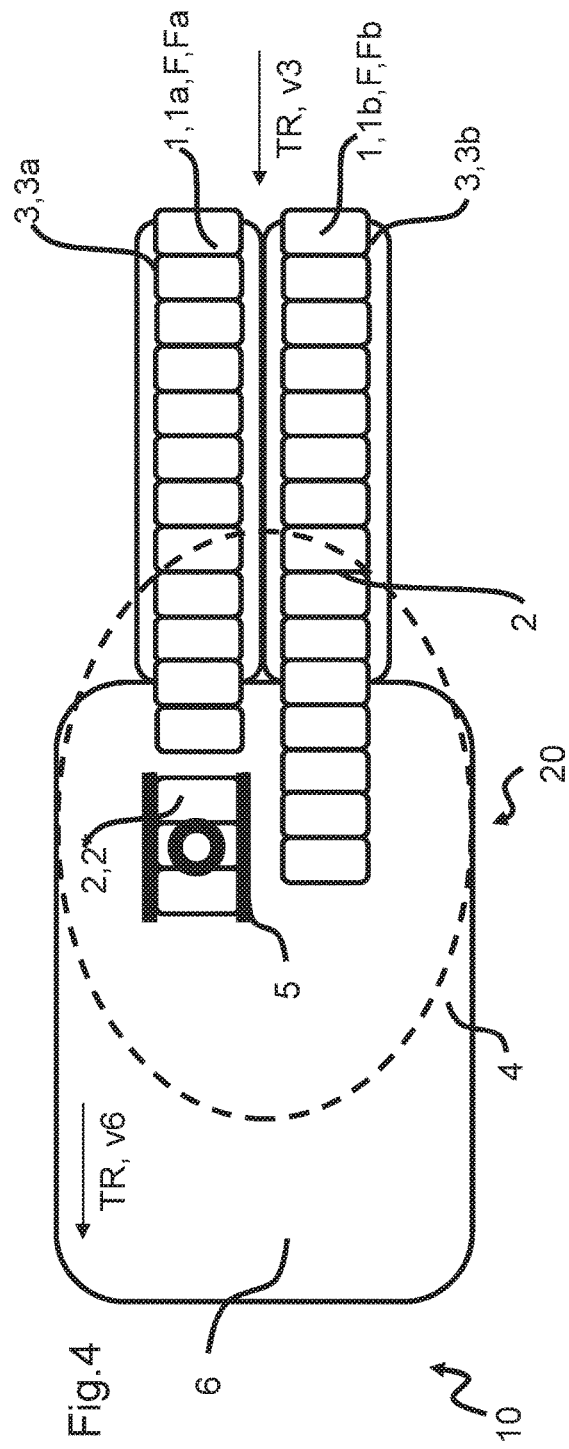

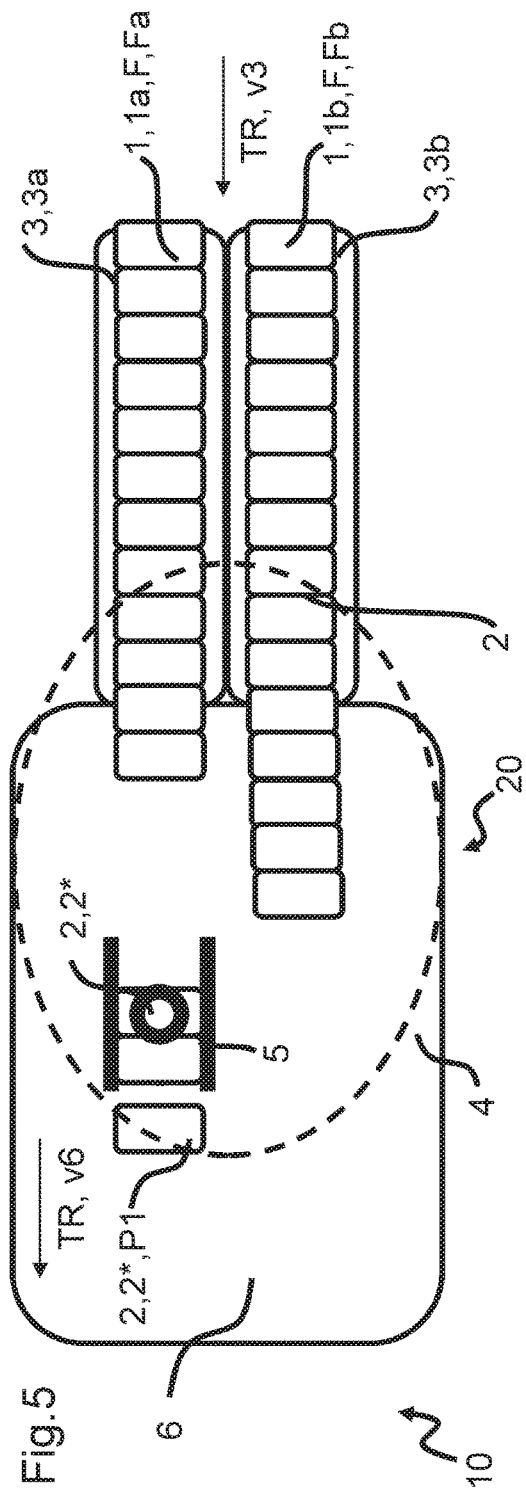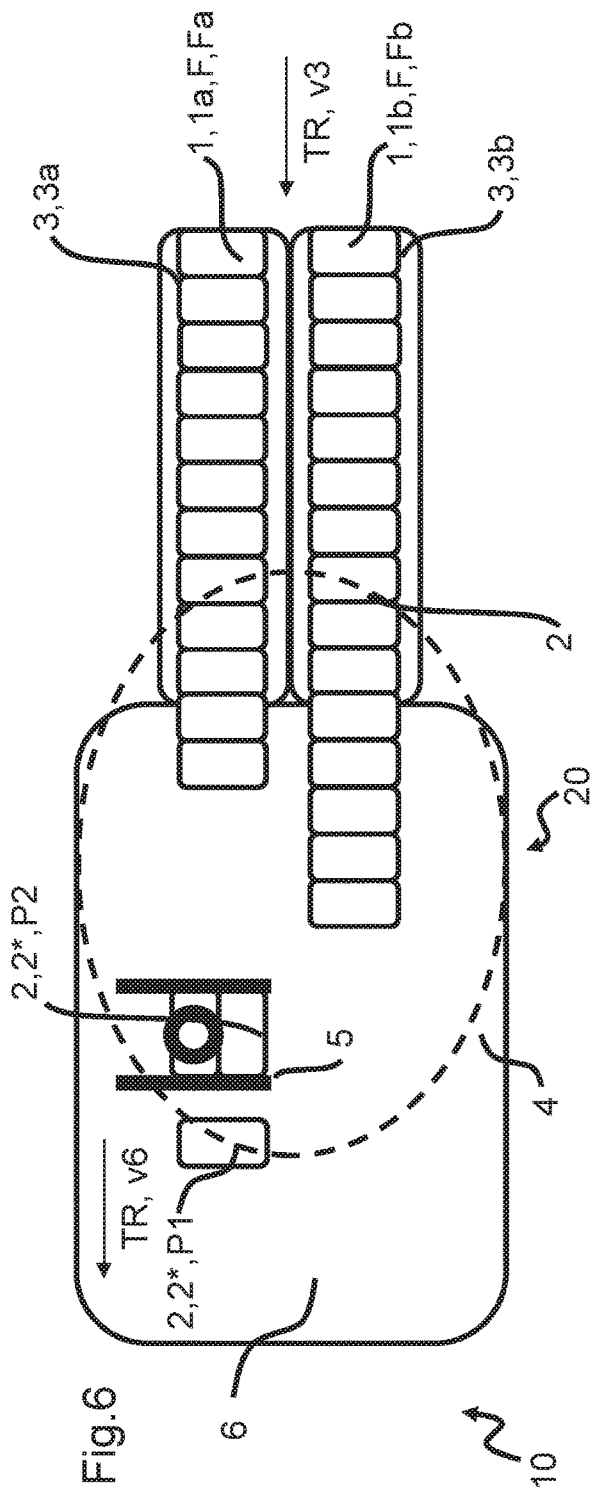

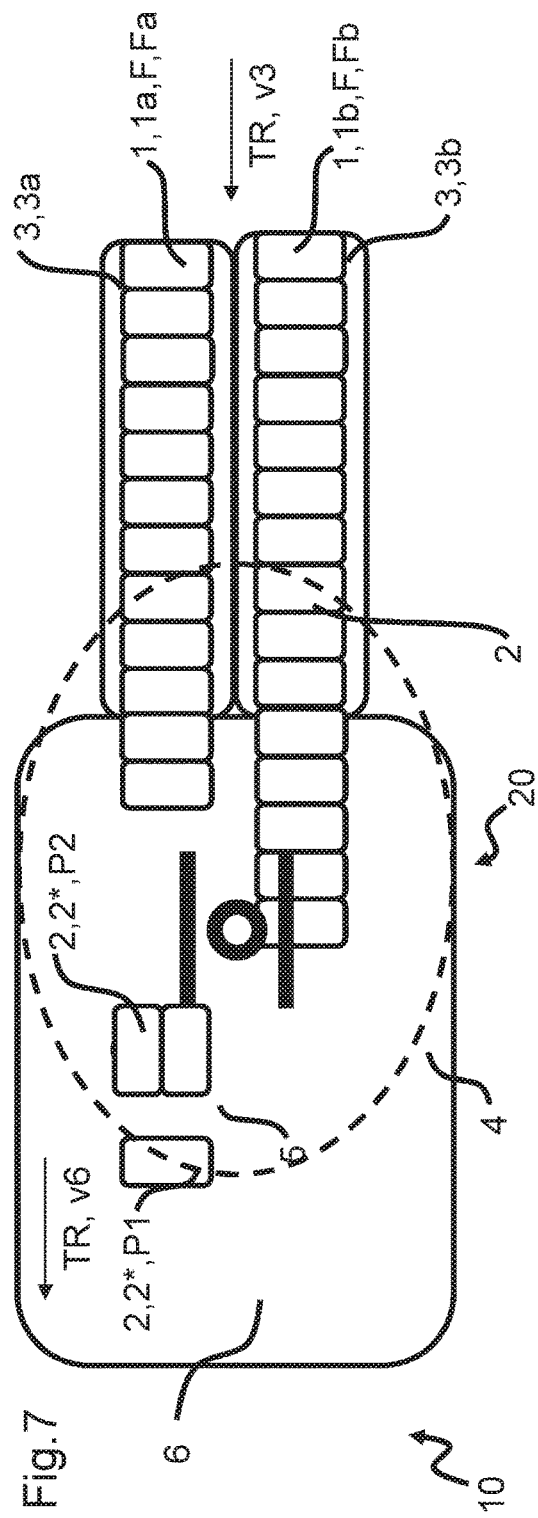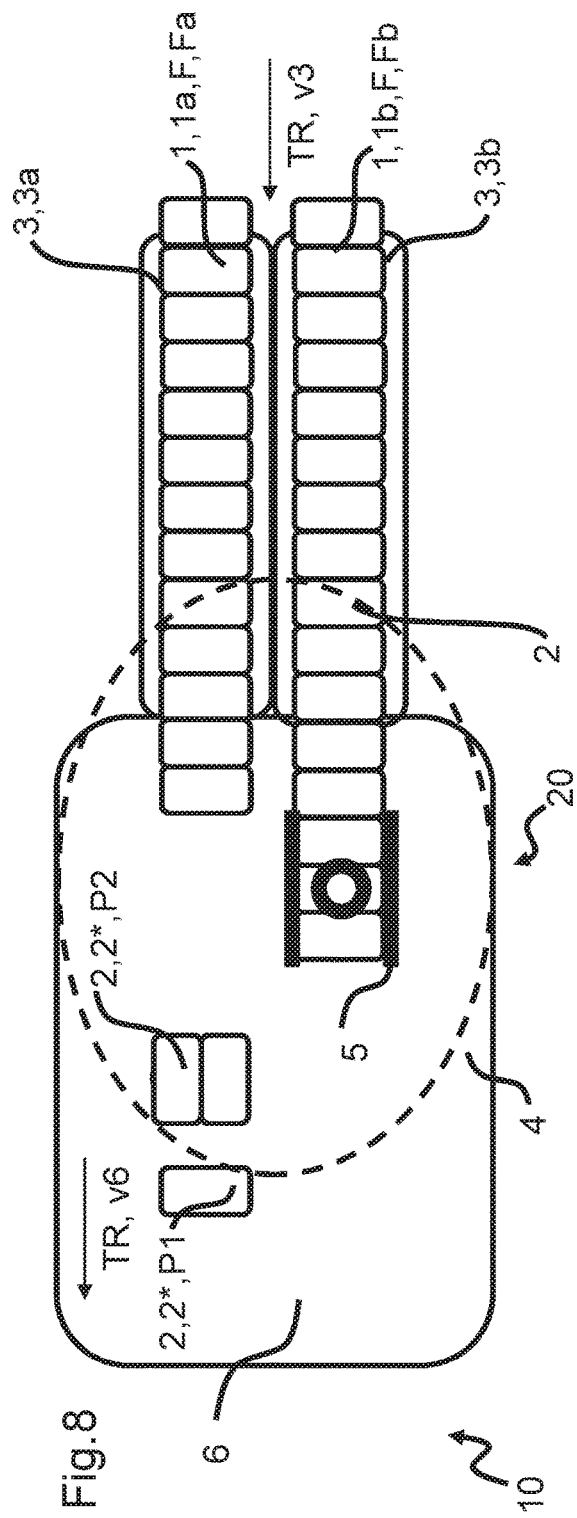

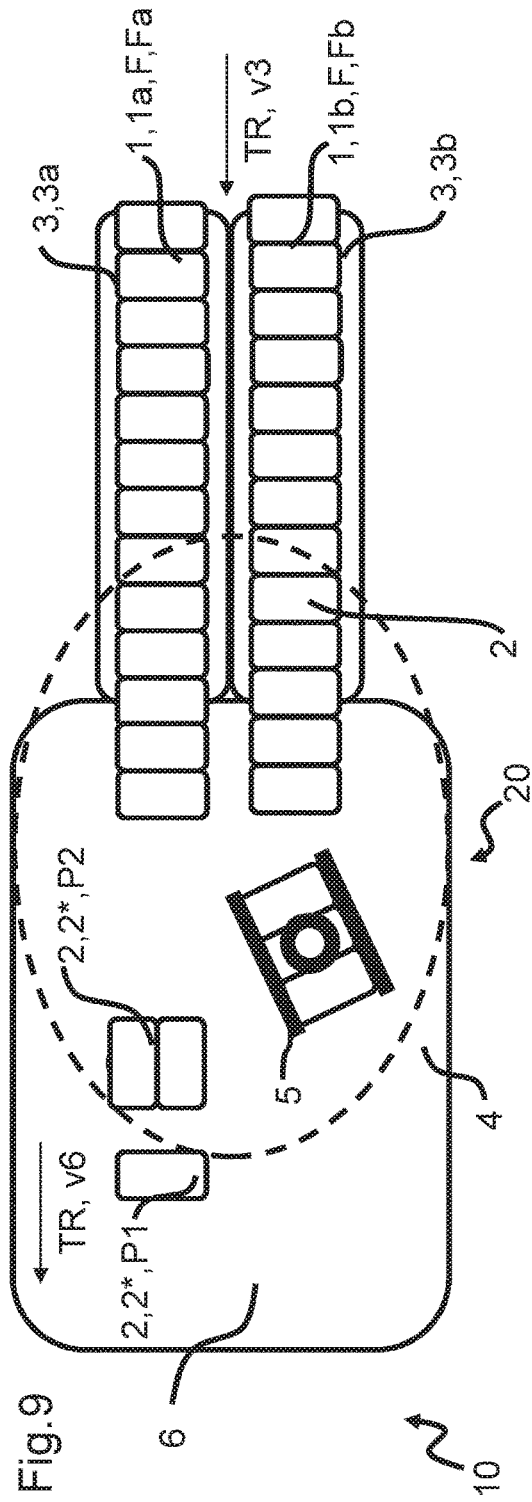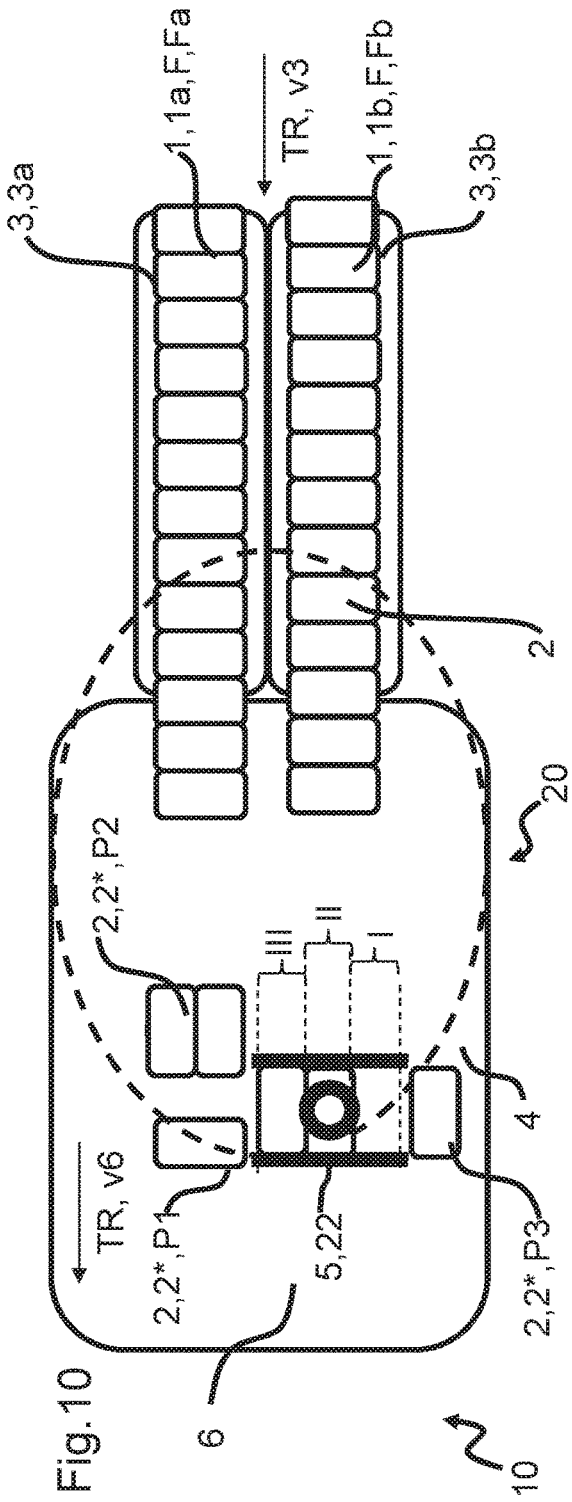

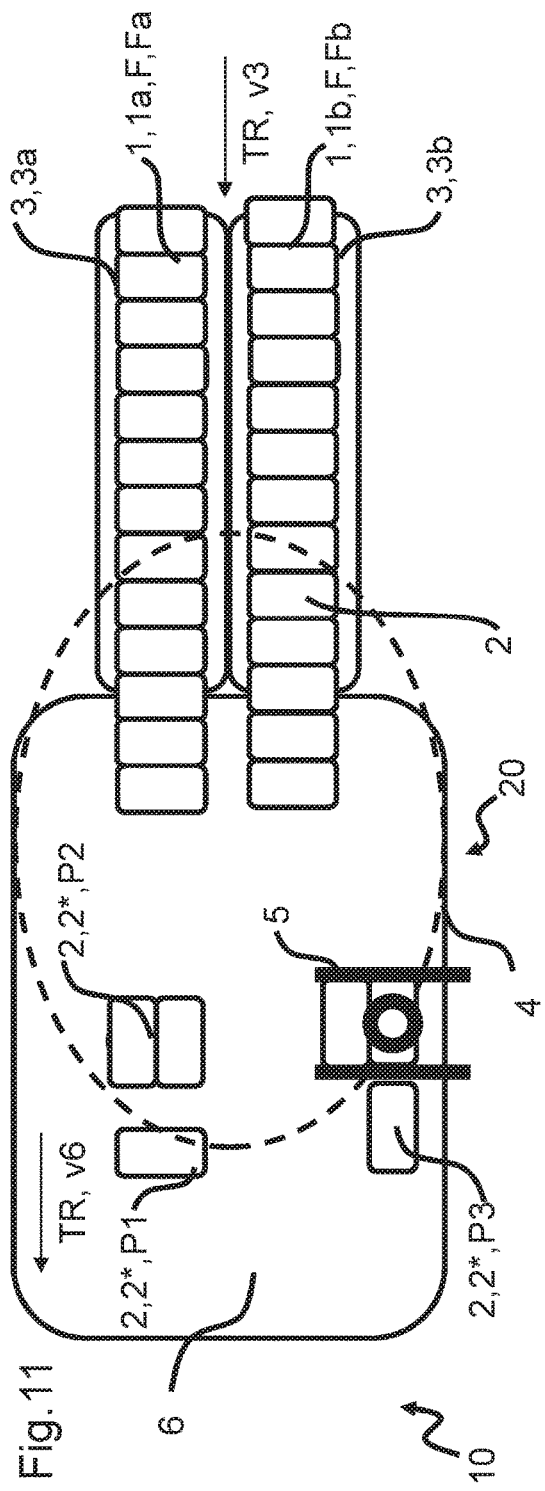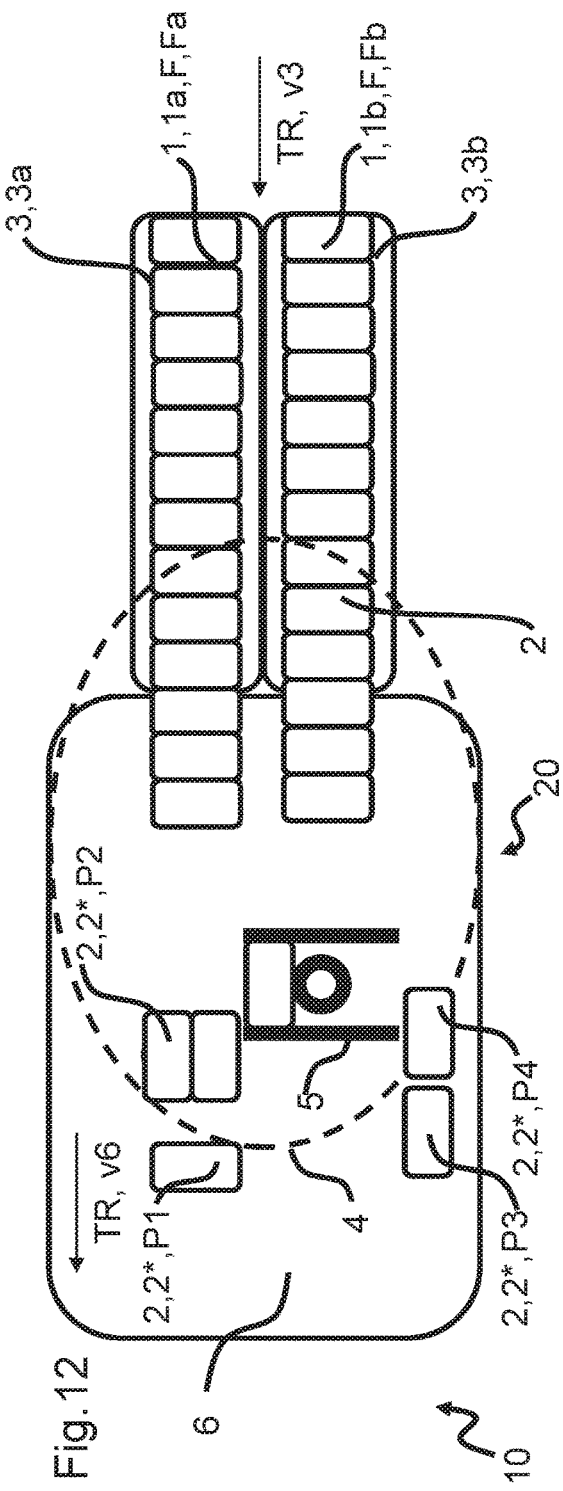

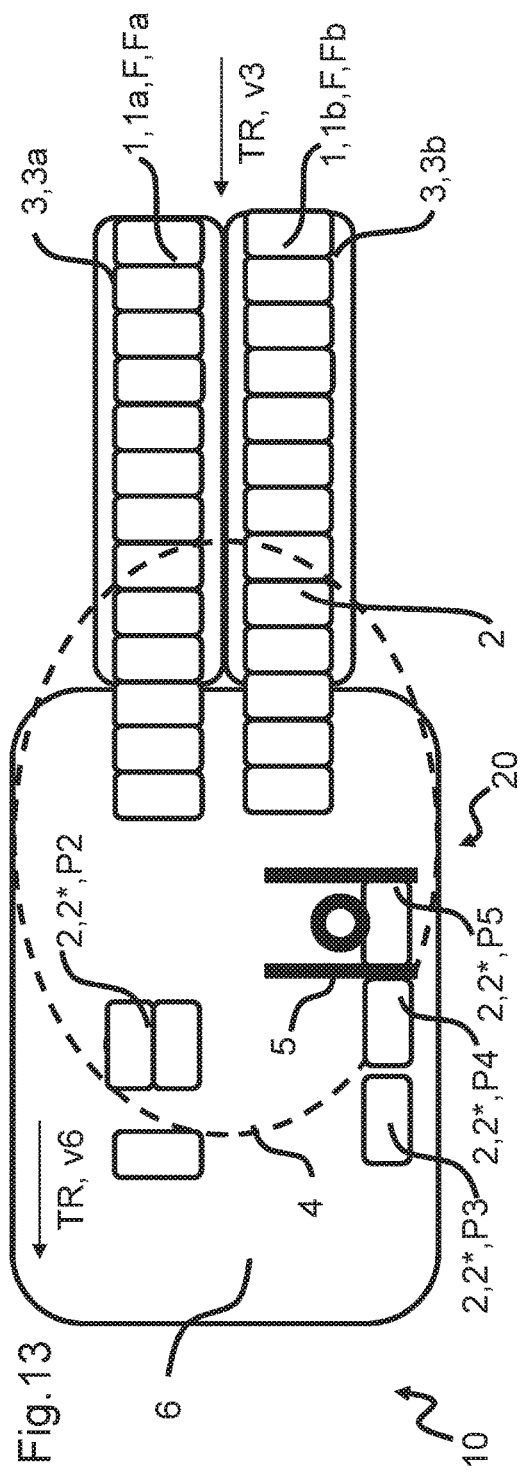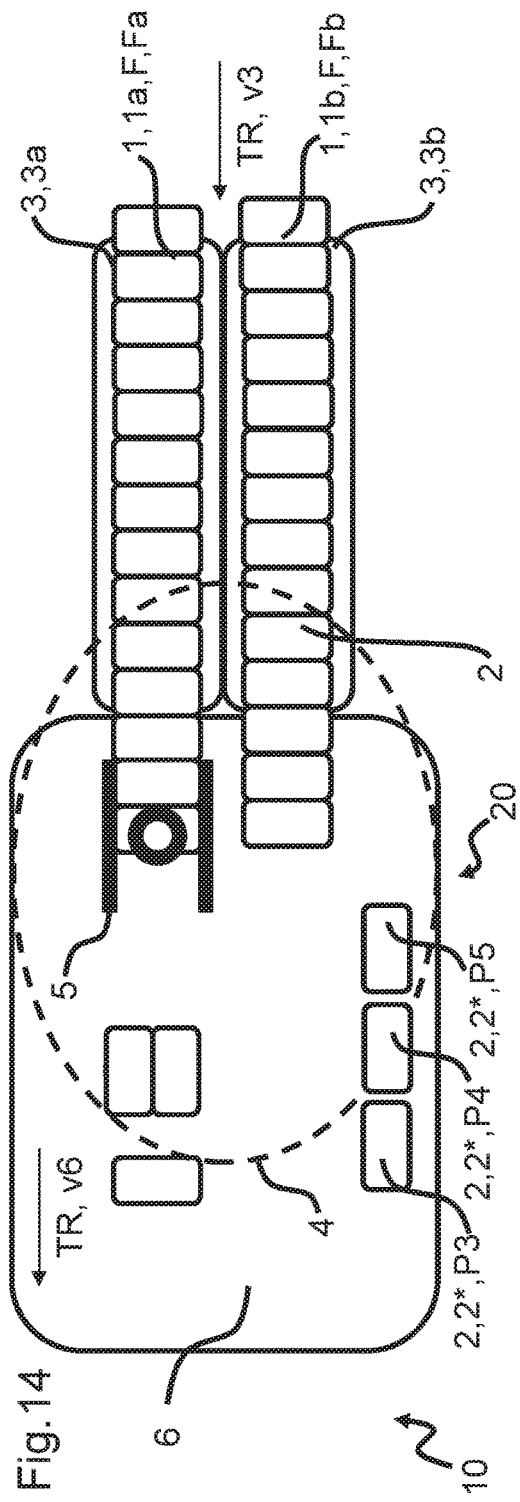

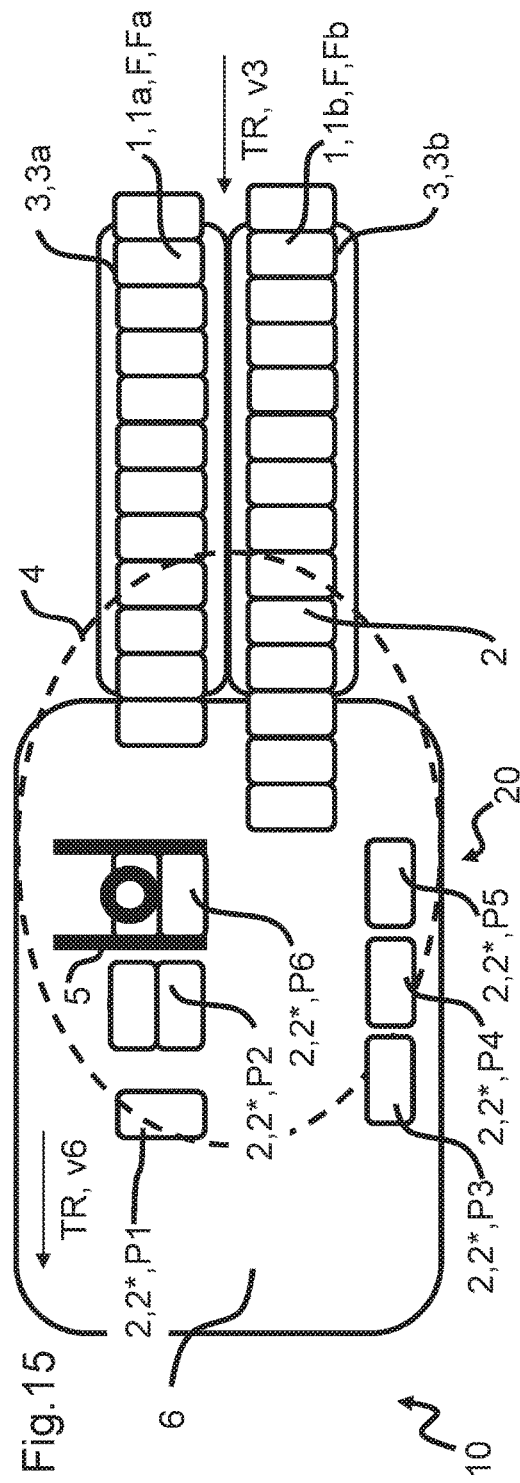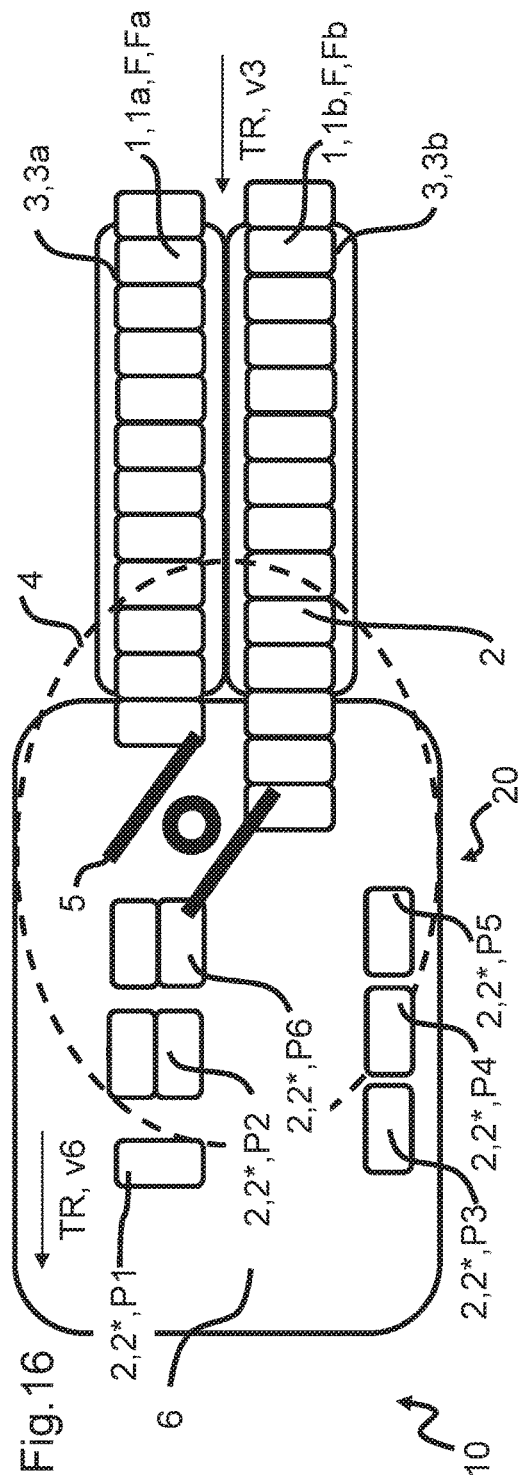

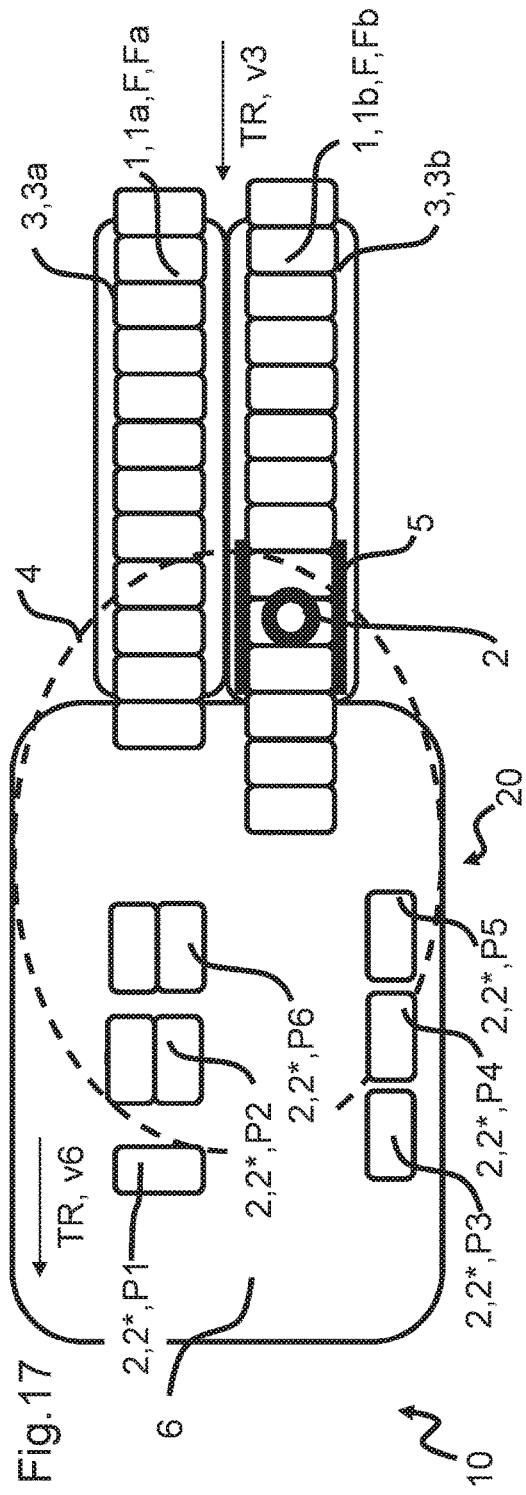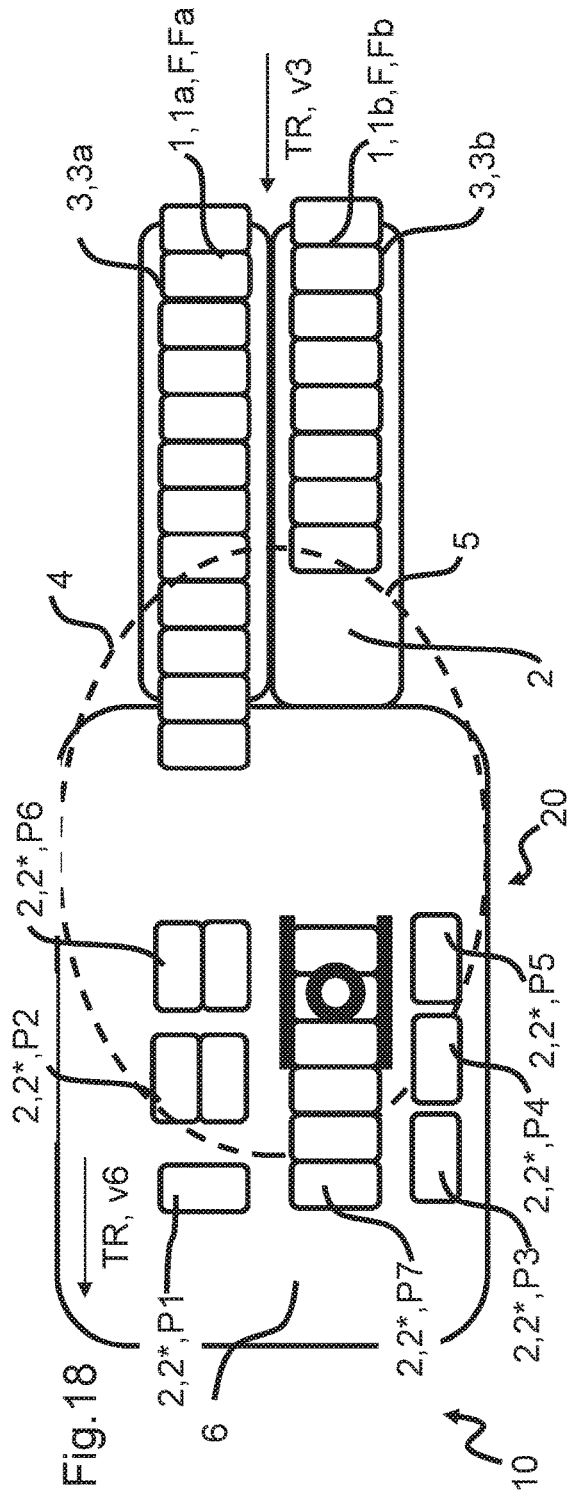

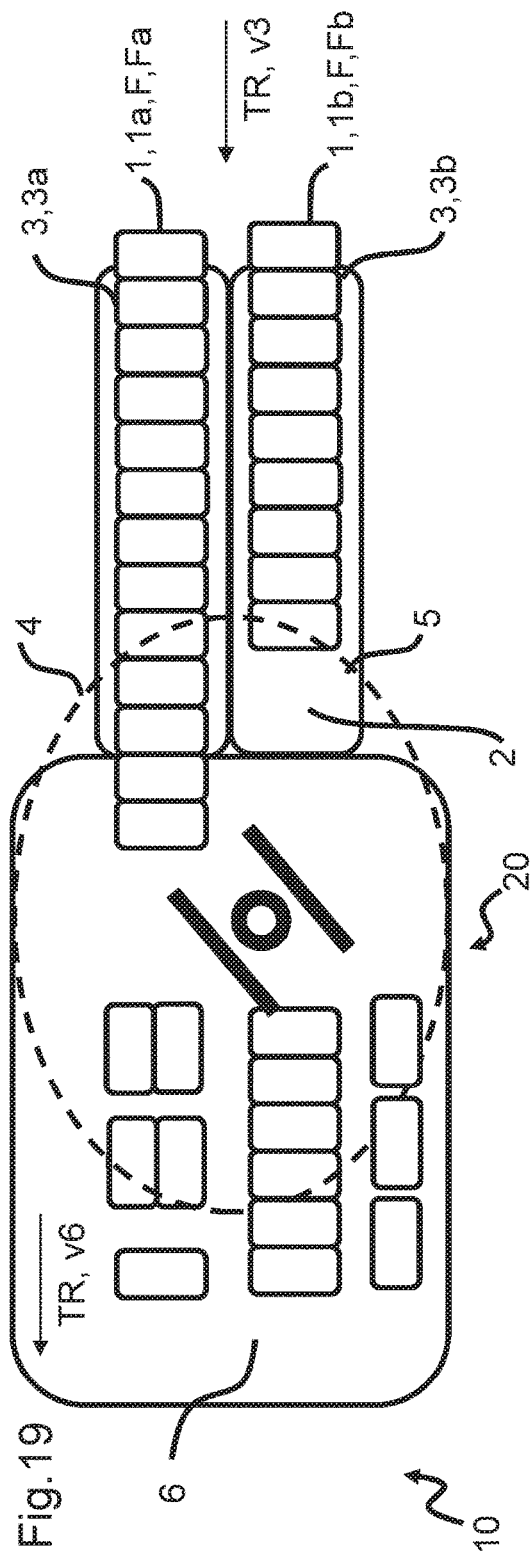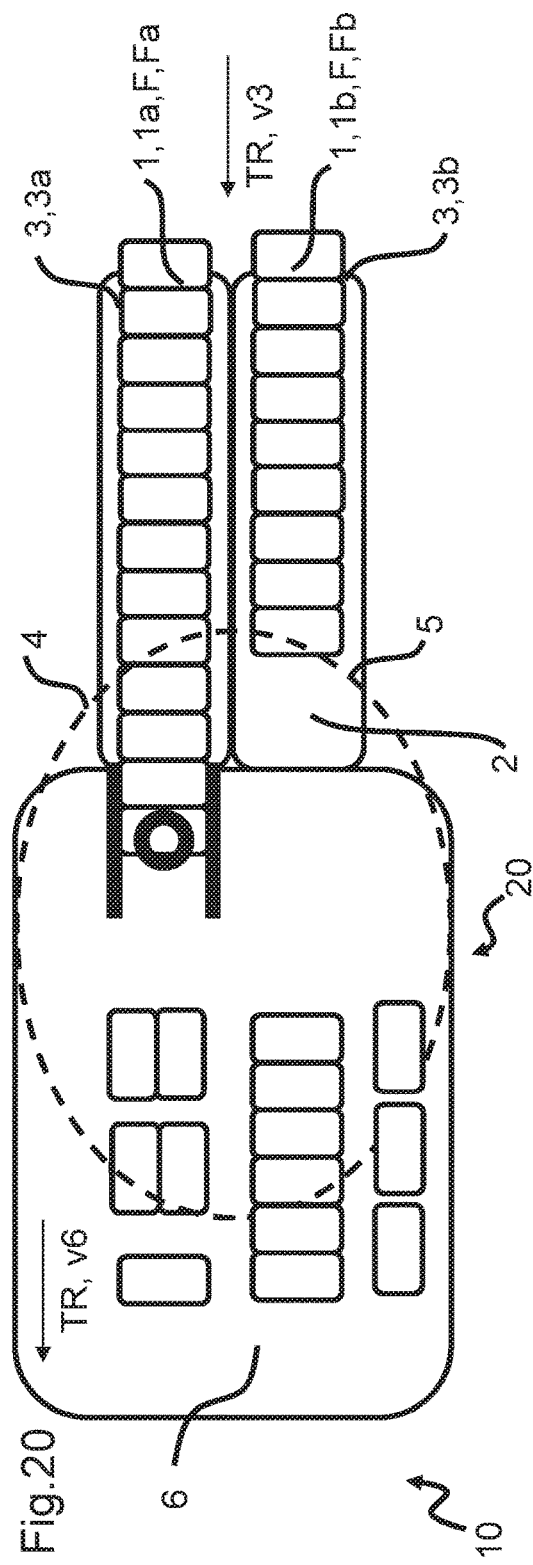

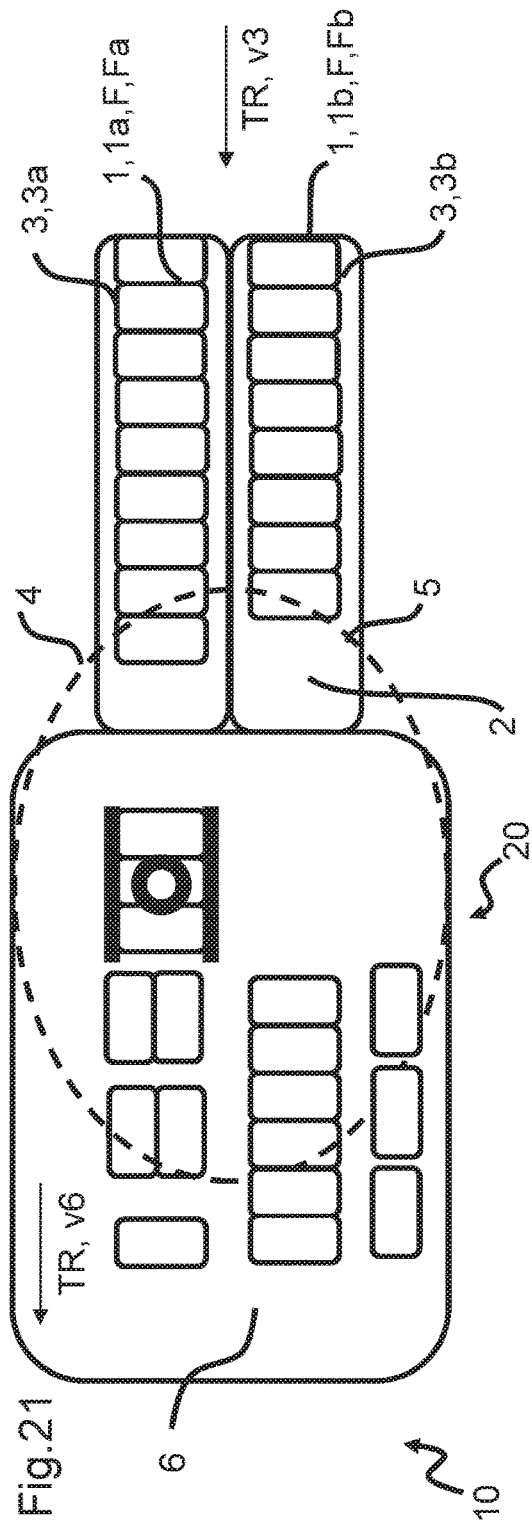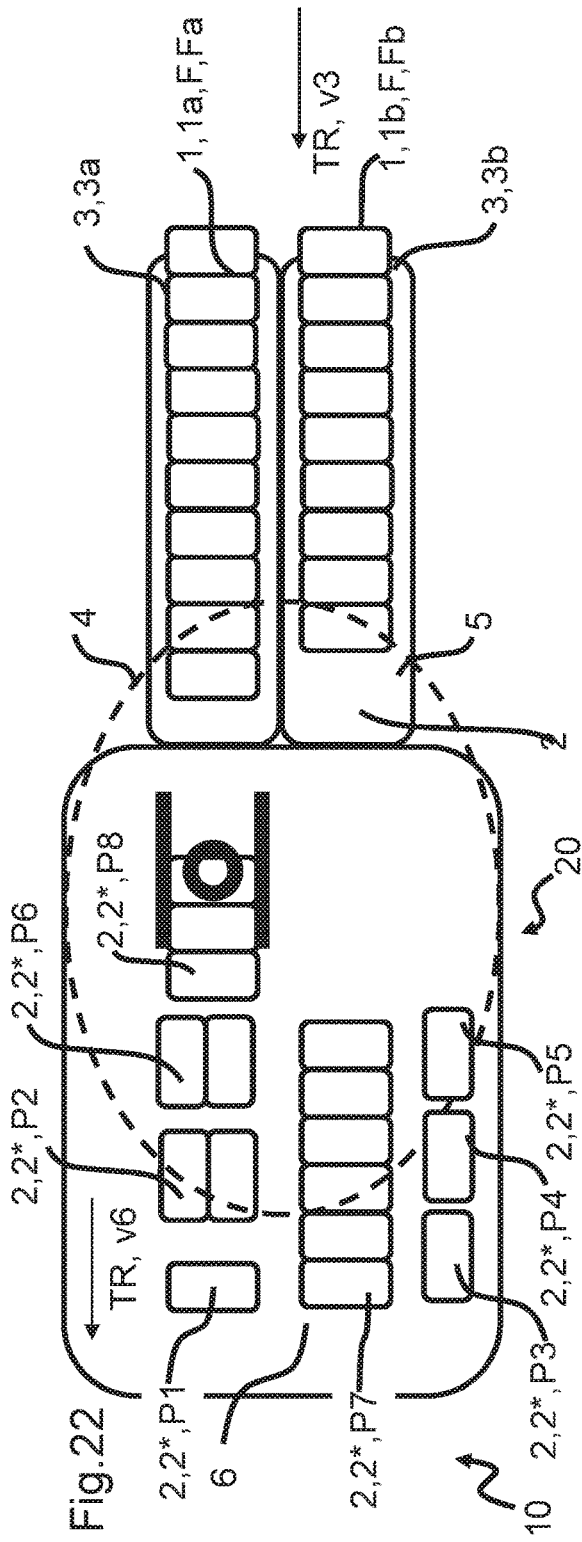

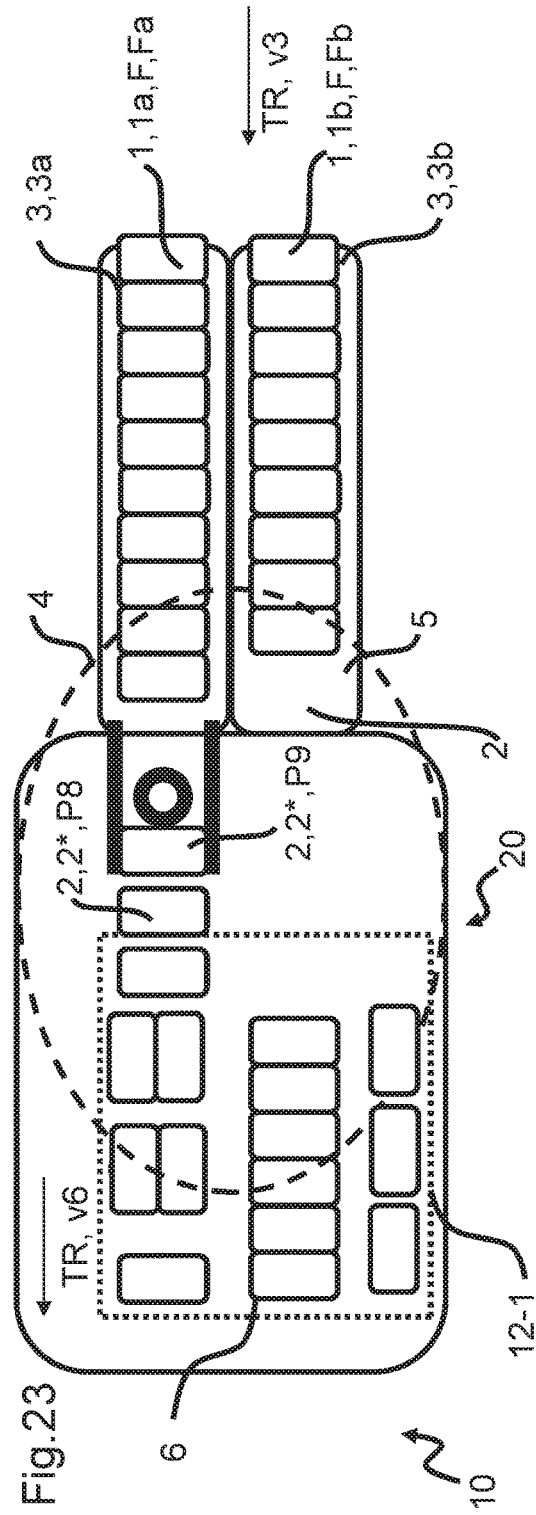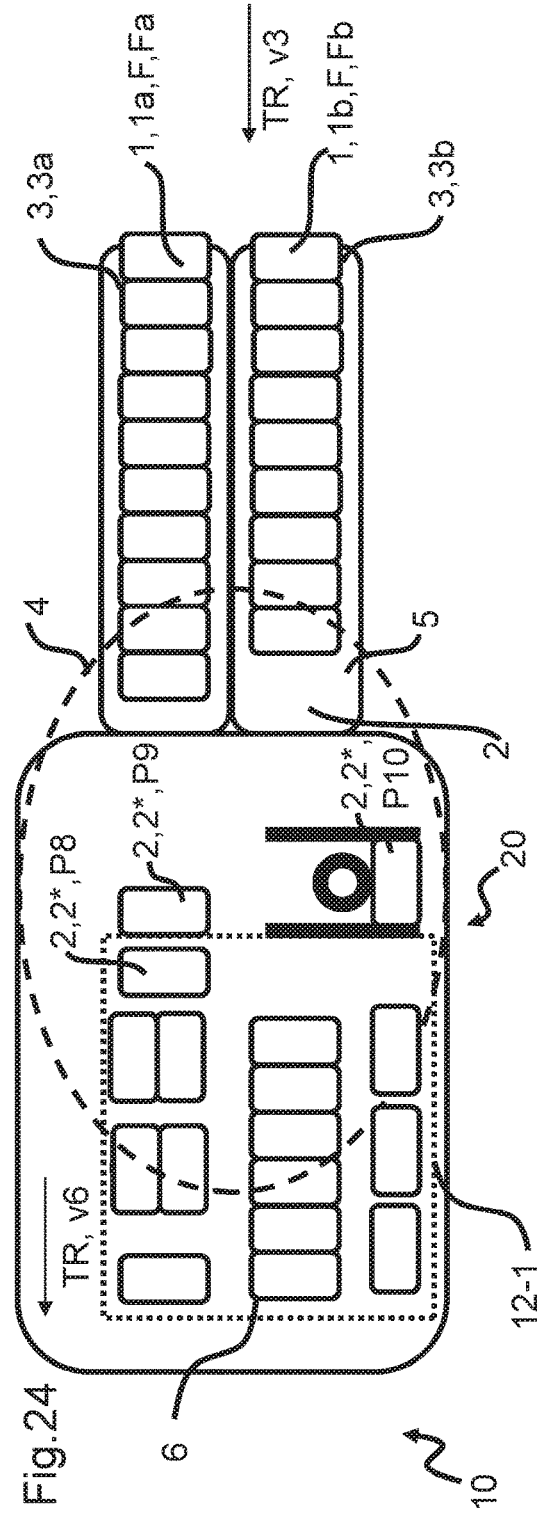

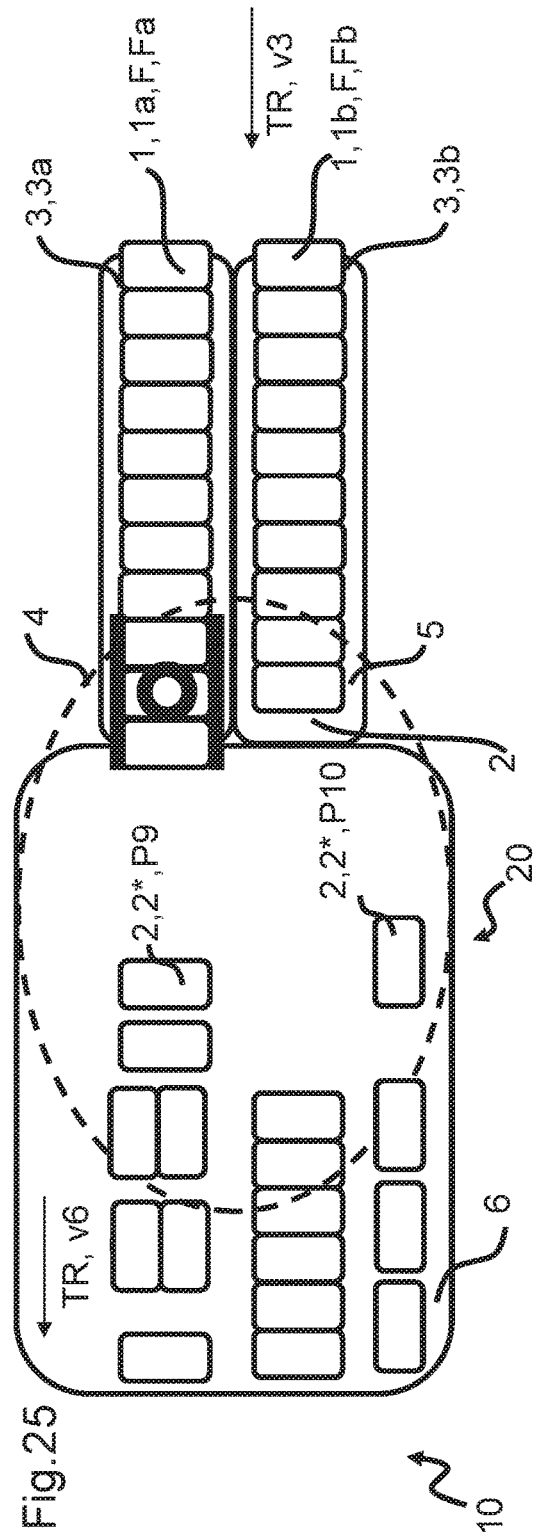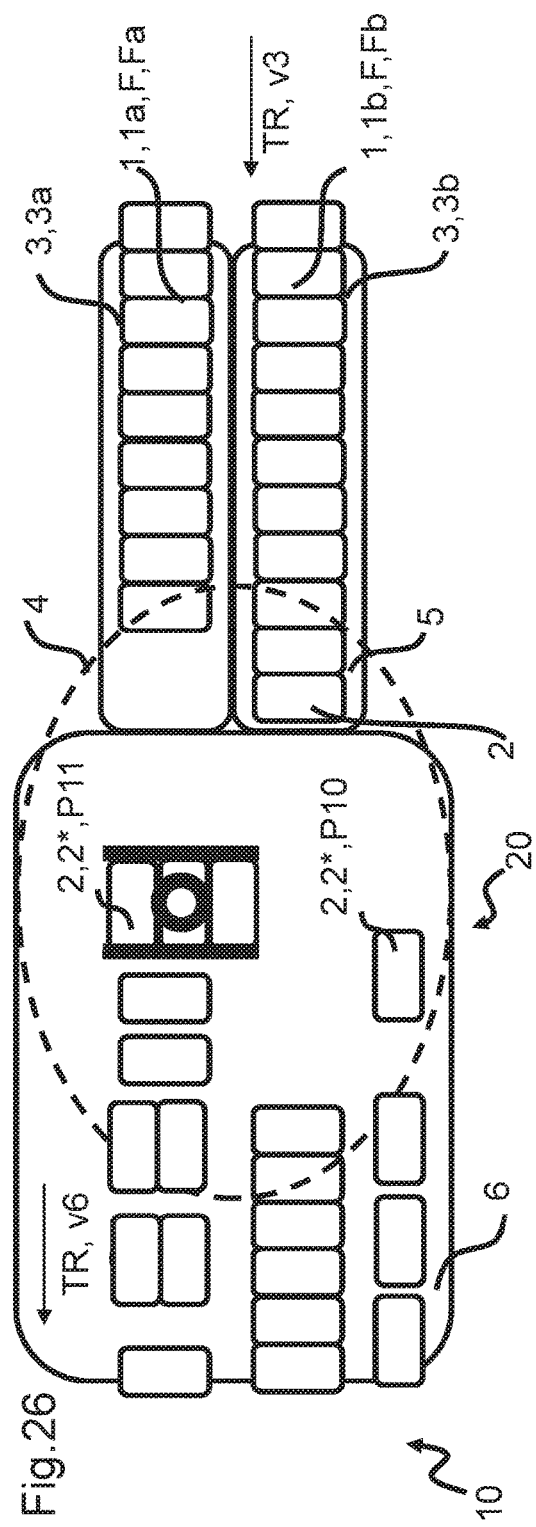

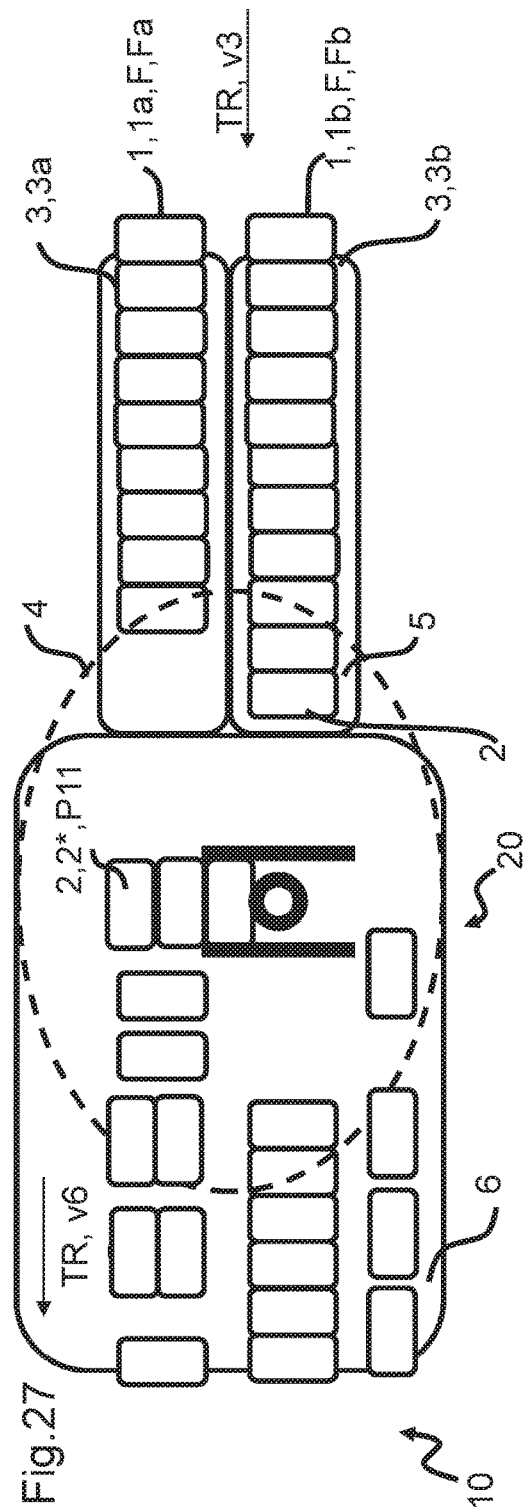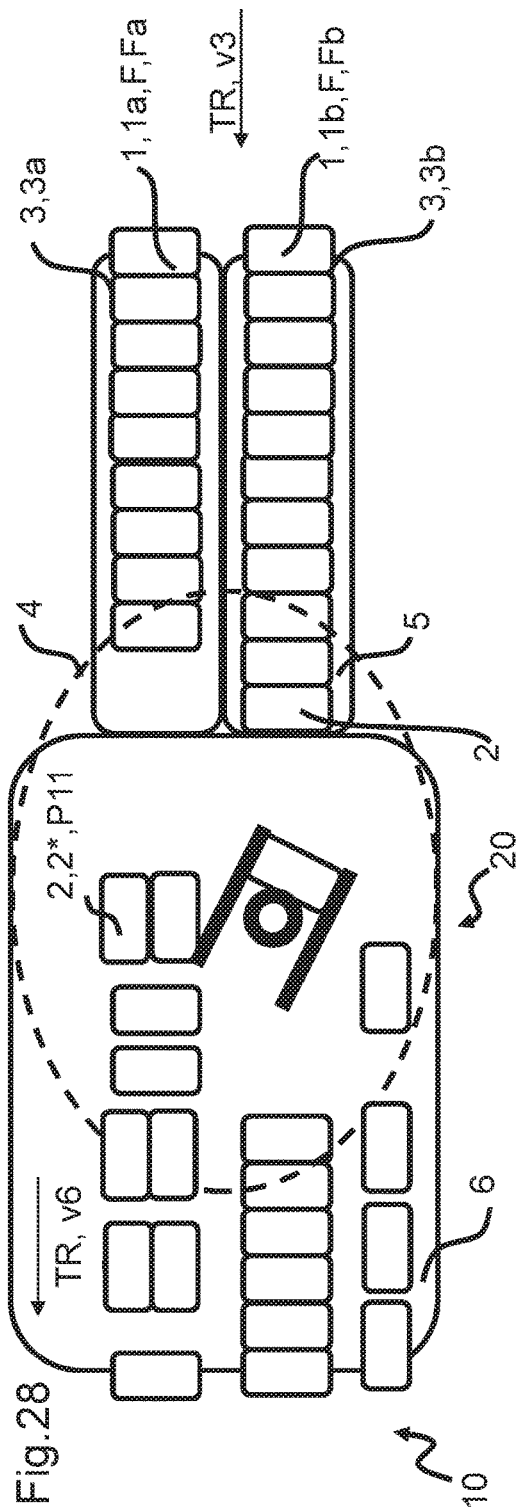

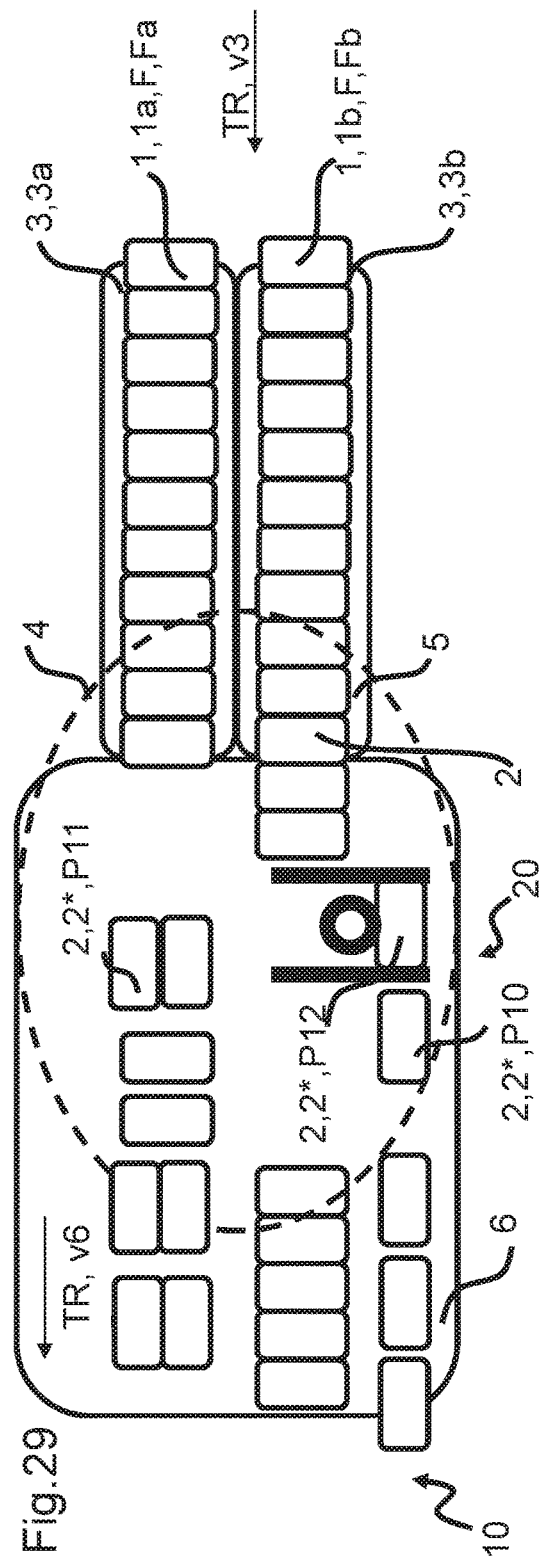

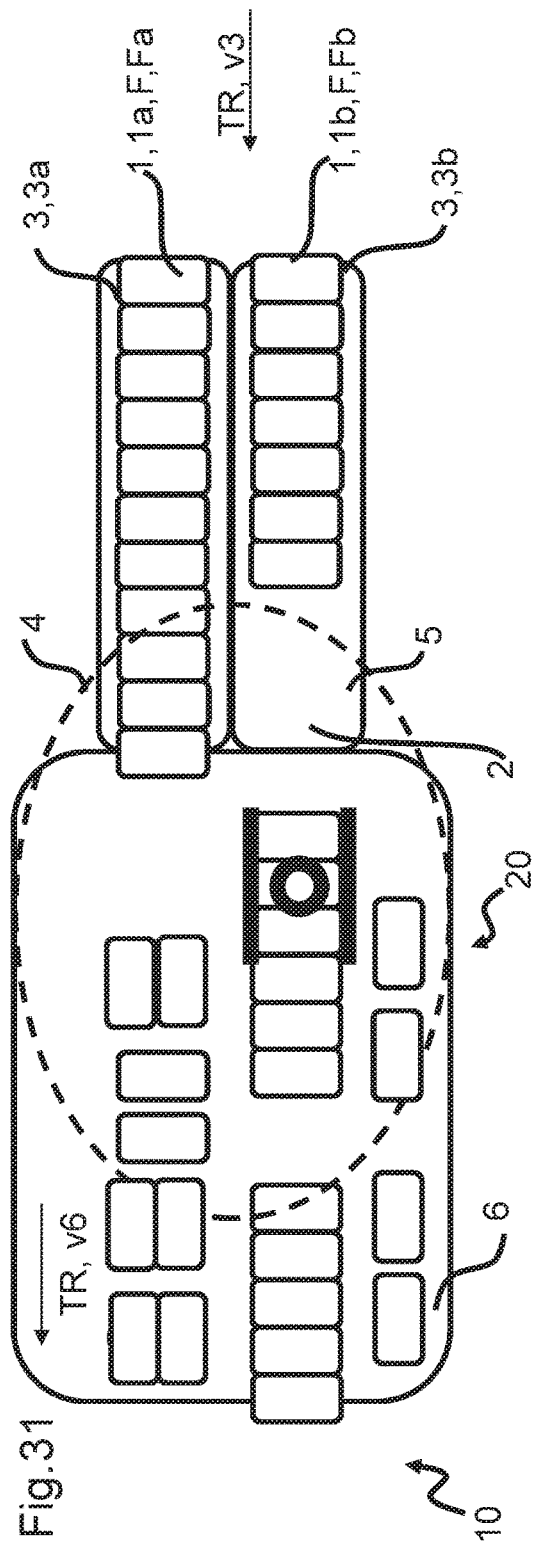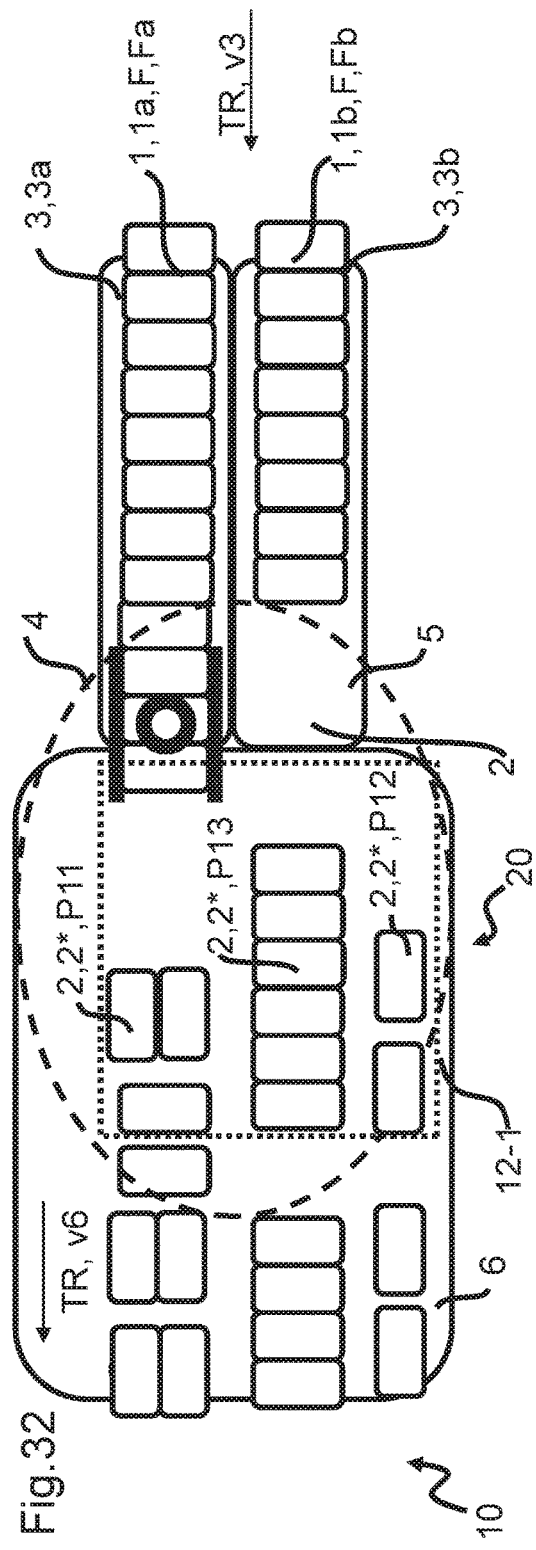

METHOD AND APPARATUS FOR HANDLING PIECE GOODS MOVED ONE AFTER THE OTHER IN AT LEAST ONE ROW

CLAIM OF PRIORITY

The present application claims priority to International Application PCT/EP2017/053873, filed Feb. 21, 2017, which in turn claims priority to German Application DE 10 2016 111 539.8, filed Jun. 23, 2016, which are incorporated by reference.

FIELD OF THE INVENTION

This invention concerns a method and apparatus for handling piece goods moved one after another in at least one row

BACKGROUND OF THE INVENTION

In the known methods for packaging and/or palletizing piece goods, such as packages, bundles, or the like, these are first conveyed on transport devices conveying in lines, and are shifted, aligned, and/or assembled in a suitable manner for producing desired layer patterns that can be subsequently stacked in multiple layers on top of each other, for example on pallets prepared for this purpose. These treatment steps can be particularly useful with facilities for treating beverage containers. The piece goods in question can be, for example, packages, crates, cartons, bundles, or other clusters. For the mentioned pallets to be safe for transport, the assembled layer patterns, which are also referred to as assembled cycles, have to meet certain requirements. In order to form such cycles, it is customarily necessary to perform preparatory procedures, which consist, for instance, in first conveying piece goods regularly or stepwise on a so-called dosing belt, in then grouping or gathering them on an intermediate transport belt, and in delivering them together and/or in groups from there to a layer-forming belt or a layer-forming table.

In the prior art it is known to deliver single piece goods from a dosing belt onto a transport belt, which means that in each instance individual piece goods are delivered to the transport belt. This delivery can be carried out by each individual piece good being individually delivered onto the transport belt by a velocity difference between dosing belt and transport belt; a control by optical sensors, for example light barriers, can additionally be in place. It is likewise conceivable to convey the piece goods in a spaced-apart manner from the transport belt by operating the layer-forming belt in a stepwise manner. In order to deliver in each instance individual piece goods from the transport belt onto the layer-forming belt in such a manner, the layer-forming belt can be operated in steps that are synchronized with the transport belt by exactly one length of a piece good in transport direction. These cycles or groups or parts of grouped piece goods, as the case may be, can also be rotated on the transport belt according to the desired layer pattern in order to then be delivered to the layer-forming belt.

Prior art knows different embodiment variants for designing grouping tables that serve to bring together piece goods, such as cartons, shrink packs, trays or plastic crates. Piece goods can be brought together by being assembled into a two-dimensional formation (block construction, e.g. pallet layer), for example. For this purpose, a roller conveyor, for instance, can be supplied linearly from one or several lanes. According to requirements, the piece goods can be rotated prior to or on the roller conveyor, and they can be arranged in each required position mechanically by stop points. The piece goods positioned in such a way can then be pushed off from the roller conveyor in a direction orthogonal to the transport direction. Supplying, arranging, and pushing off the piece goods can in this context be regarded as a cycle. At least one such cycle is needed to assemble one layer, normally, however, a plurality of such cycles are needed to generate a layer. The partly discontinuous conveyance with its relatively abrupt speed changes or direction changes causes accordingly high mechanical stress on the piece goods, which is possibly detrimental to product-protective processing of the piece goods.

Document EP 1 456 101 A2 discloses an apparatus for forming rows from packaging goods for bundle palletizers. The bundle palletizer comprises at least one layer generating station and at least one palletizing station. The row forming apparatus comprises at least one positioning station, on which the packaging goods are arranged at desired distances in at least one row during the transport. The positioning station connects to a staging conveyor associated with the layer generating station. At least one accumulating conveyor is disposed upstream from the positioning station, which has several conveyor sections arranged consecutively in transport direction with controllable and regulatable drives. The controllable and regulatable drives make it possible to achieve the desired distances between the packaging goods. The row forming apparatus has at least one monitoring device for identifying and monitoring the distance forming between the packaging goods. The construction of this known row forming apparatus is rather elaborate and complicated, especially as many belts are required for forming the spaces and/or for rotating the packaging goods.

An apparatus is known from U.S. Pat. No. 5,123,231 A for assembling articles into groups and subsequently packaging them. On a feeder belt and in each instance with predefined spaces, the articles are fed to a collection belt where the groups are assembled from an unvarying number of articles. The groups are then fed to a subsequent belt of a packaging device.

EP 1 927 559 A1 discloses a grouping table for bringing together bundles, in particular shrink packs, for the purpose of forming layers, the grouping table comprising a continuously drivable conveyor, a cyclically drivable step conveyor disposed downstream from the conveyor, a layer-forming station disposed laterally to the step conveyor, and a push-off device associated with the step conveyor and acting orthogonal to the conveying direction for the groupwise transfer of the bundles onto the layer-forming station.

US 2005/0246056 A1 discloses a system for arranging packaging items into a layer that is deposited or stacked on a pallet in following handling procedures. It involves three linearly arranged conveyor belts. Via a first conveyor belt, the packaging items are supplied to the apparatus. The packaging items are disposed linearly on the first conveyor belt. With the second conveyor belt, the packaging items are spaced apart. Subsequently, the packaging items reach a third conveyor belt, where the arrangement of the packaging items is carried out. All three conveyor belts run at different, however, in each instance constant speeds. When a layer is completely assembled, it is transferred onto the pallet.

The known prior art as illustrated by the various documents can in practice have several disadvantages. During gap formation or during transfer of piece goods between feeding belt, conveyor belt and layer forming belt the risk arises that the piece goods cannot be transferred in the desired exact way due to the respective speed differences and high acceleration ramps and/or correspondingly steep deceleration ramps. Individual piece goods can even turn away from their predefined positions. The friction resistance between the respective conveyor belt or transport belt and the underside of the respective piece good also plays a role that cannot be neglected, which friction resistance can result in gaps between the cycles not being exactly reproducible but being variable. In addition, a loss of efficiency can occur as a result of the distance to be covered by the individual gaps during the so-called synchronization from the feeder belt to the conveyor belt. All these effects increase the time needed to create a pallet.

In order to avoid these disadvantages, EP 2 107 018 A1 proposes a method and an apparatus to enable safe, fast and high-quality supply of cycles from bundles and/or groups of bundles in order to be able to effectively produce the rows for the layers of a pallet. The proposed device is used for assembling and aligning groups of bundles, the apparatus comprising a feeder belt, a transport belt and a row forming belt or layer forming belt. The feeder belt, the transport belt and the row forming belt or layer forming belt are each equipped with their own motor as actuator. The speed of the feeder belt is controlled by a control unit so that the bundles or groups of bundles directly adjoining each other on the feeder belt can be divided into several cycles of bundles or groups of bundles on the transport belt. Predefined gaps are created between the individual cycles. A robot can be assigned to the row forming belt or layer forming belt, which robot can shift and/or rotate the cycles arriving from the transport belt in the transport direction or transverse to the transport direction for layer formation. In addition, the layer forming belt should enable the generation of a layer formed from several rows.

From DE 10 2011 080 812 A1, a method for forming palletizable layers comprising adjoining piece goods on a layer forming station is also known. A program-controlled manipulator is assigned to the layer forming station for seizing and/or transferring individual or several piece goods to at least two spatially separated and/or spatially offset feeding stations and for positioning the piece goods into predeterminable release positions on the layer forming station by rotating and/or shifting.

Manipulators of this type or also robots associated with the layer-forming belts can be designed as multi-axis robots, for example, such as are known from DE 10 2009 026 220 A1, for instance, in the context of grouping articles or beverage containers. A frequently used variant of such manipulators are so-called gantry robots, which are often employed in a modular structure in packaging lines, in grouping units, or in palletizing stations. A conveyor belt extending horizontally in longitudinal direction of the conveying level, or a different endlessly circulating means, are types of frequently used transport means or conveying units, on which the objects and/or packages are disposed in predetermined or in randomly assumed positions. Such a module is known, for example, from DE 10 2009 043 970 A1. The gantry robots that are typically employed in such modules, as known, for instance, from DE 10 2010 020 847 A1, can be equipped with gripping apparatuses, for example, for lateral seizing of the piece goods to be handled or manipulated.

The main objective of all known handling systems is to enable precise positioning of piece goods, packages, bundles and/or articles in order to ensure a failure-free and reliable preparation for layer forming, palletizing, and/or packaging. A secondary object that is, however, becoming increasingly important, lies in reducing the cycle times without reducing the already achieved degree of precision and without having to accept decreases in terms of the already achieved reliability. In addition, a further aim of the present invention is to reduce the deflections and movement trajectories of the handling systems used for layer formation, which can contribute to reduced mechanical loads and component loads in the handling systems or handling robots that normally operate at high speeds and correspondingly short positioning times.

The purpose of the method is to enable the processing and handling of piece goods which are conveyed or transported in at least one row. In addition, the method should be able to run at a higher speed than was previously possible without creating disadvantages in terms of piece good positioning precision and/or piece good manipulation reliability. The corresponding apparatus shall be operable faster than the manipulation devices known from the prior art, and this should be done with at least approximately the same reliability and approximately the same setting precision.

These objectives of the invention are achieved with the objects of the independent claims, i.e. with a method and an apparatus for handling piece goods moved one after another in at least one row, comprising the characteristics of the independent patent claims. Features of advantageous further developments of the invention are indicated in the respective dependent claims.

SUMMARY OF THE INVENTION

The invention relates to a method and an apparatus or handling apparatus for handling piece goods moved one after another in at least one row. If therefore in some passages a method, a method variant, the method according to the invention or the like is referred to in the context of the present description, this is intended to generally mean the mentioned method for handling piece goods moved one after another in at least one row. If, furthermore, in some passages an apparatus, a handling apparatus, an apparatus variant of the apparatus according to the invention or the like is referred to in the context of the present description, this is intended to generally mean the mentioned apparatus for handling piece goods moved one after another in at least one row. If handling of piece goods is referred to in the following description, in the descriptive passages relating to embodiments of the invention, in the claims and/or in connection with the entire disclosure comprising the figures and respective description, this is intended to comprise handling, seizing, positioning, moving in space, rotating, aligning, etc., in particular in the context of a manipulator and/or movable parts of the manipulator that are disposed in a seizing space or seizing range and that can move there within definable limits. The term of handling, however, likewise comprises positioning steps, conveying steps, and/or any types of handling steps that can take place in the context of conveying devices, horizontal conveying devices, transport belts, etc. that are part of the apparatus according to the invention and/or are in operative connection and/or in a transport connection therewith, be they parts that are arranged downstream or upstream in transport direction and/or conveying direction, or be they integrated parts of the apparatus according to the invention.

If an unchanged or new alignment of the piece goods after the seizing and/or handling is referred to in the context of the presently described apparatus and presently described method, this is intended to mean, in particular, the angular alignment of piece goods that are previously seized and moved and/or shifted and/or rotated by the manipulator. Seizing in the present context usually means gripping a piece good or gripping a plurality of piece goods simultaneously in a physical, form-locking and/or force-locking and/or clamping manner, as well as the handling thereof up to the point of reaching a target position and/or target alignment.

The piece goods can be articles, packaging items, container sets, bundles, cartons, or the like moved one after another in one row. It can be provided, for example, that a plurality of articles of the same or of different kinds are gathered together in a bundle or in a mixed bundle by an external cardboard packaging, by a strapping or by a plurality of strappings, by a film packaging, or the like. Furthermore, a plurality of beverage containers held together, for example, by a shrink wrap, by a strapping tape or a plurality of strapping tapes, can in each case form one piece good according to this definition. The piece goods moved one after another in one row can in this context be formed to be the same or to be different, according to requirements of subsequent handling apparatuses.

The at least two immediately consecutive piece goods moved and/or being conveyed within one row without spaces or with minimal spaces to an area—the area being referred to, in particular, as manipulating range or seizing range, as the case may be—are especially transported as a closed formation. The term "closed formation" is intended to mean a largely unspaced succession of piece goods transported one after another in one row. The closed formation in the sense of the present invention can be of finite length and comprise a limited number of piece goods, whereupon a gap can follow, and upon such a gap another such formation can follow which is subsequently transported. Such a sequence can be repeated, too, if applicable, a plurality or a multitude or an undefined number of times. The closed formation can also be transported as an endless formation that has no interruption and comprises an optional number of piece goods. In the closed formation, the piece goods can be transported in particular directly adjoining each other. This is caused, for example, by a back pressure applied once from behind. The back pressure is generated preferably before or shortly before the seizing range of the at least one manipulator of the handling apparatus. Alternatively, it can be provided that at least a slight back pressure acts permanently on the piece goods from behind.

In a first manipulation step or method step, at least two transported piece goods are seized from the respective closed formation in the seizing range of a manipulator in a clamping and/or force-locking and/or positive-locking manner, in a second manipulation step or method step the seized piece goods are spatially separated from the closed formation and in a third manipulation step or method step they are brought into a defined relative first target position and/or target alignment with respect to subsequent piece goods of the formation.

The seizing of the at least two piece goods by clamping is preferably carried out by clamping elements and/or gripping elements of the at least one manipulator. If "seizing" of piece goods in a "clamping manner" is referred to in the context of the present invention, this is intended to also comprise seizing, gripping, or receiving piece goods in a force-locking and/or friction-locking manner. All said variants of receiving, seizing, and/or gripping piece goods can be likewise combined with seizing, gripping, or receiving the piece goods in a form-locking manner.

If a "target position" and/or "target alignment" is referred to in the context of the present invention, this is intended to mean, in particular, that the piece goods are seized, shifted, and/or rotated; and it is also possible that the piece goods are optionally only shifted (without rotation) or only rotated (without shifting movement).

In a fourth manipulation step or method step at least one of the at least two piece goods brought into the first target position and/or target alignment is released in the reached first target position and/or target alignment by the clamping elements and/or gripping elements of the manipulator and preferably remains in this defined relative first target position and/or target alignment. The remaining of piece goods in the target position and/or target alignment is to be understood in particular relative to the support surface of the target position. If the support surface moves, the piece good is conveyed accordingly.

Subsequently, the at least one second piece good of the at least two piece goods seized in the first manipulation step or method step is seized in a fifth manipulation step or method step by the still or again activated clamping elements and/or gripping elements of the manipulator and, in a sixth manipulation step or method step, and by separation from the at least one first piece good remaining in the first target position is brought into a specific relative second target position and/or target alignment. The separation from the at least one piece good remaining in the first target position inevitably results in the second target position and/or target alignment being at a distance from the first target position.

The manipulation steps described above, i.e. the first, second, third, fourth, fifth and sixth steps, are not to be understood as manipulation steps that can be separated and distinguished from each other, but that these manipulation steps take place sequentially in the order in which they were mentioned above.

For example, if in the first manipulation step or method step three piece goods are seized by the manipulator, in the fourth manipulation step or method step two of the piece goods can be released in the first target position and/or target alignment and subsequently only the remaining individual piece good can be transferred to the second target position and/or target alignment. Alternatively, in the fourth manipulation step or method step, only one of the piece goods can be released in the first target position and/or target alignment and then the remaining two piece goods are moved to the second target position and/or target alignment. A further embodiment may provide that in a subsequent seventh manipulation step or method step, one of the two piece goods transferred to the second target position is seized again and is moved to a defined relative third target position and/or target alignment in an eighth manipulation step or method step.

In accordance with a preferred embodiment of the invention, it is provided that the at least two piece goods seized by the clamping elements and/or gripping elements of the manipulator in the first manipulation step or method step are moved in a linear direction parallel or diagonal to the original transport direction of the closed formation. For example, the at least two piece goods can reach the first target position and/or target alignment by a movement in a linear direction, so that the at least one piece good remaining in the first target position is aligned with the transport direction of the closed formation. In this case, the at least one piece good also retains the alignment that it originally possessed within the formation.

Furthermore, it may be provided that the at least two piece goods seized in the first manipulation step or method step reach the first target position and/or target alignment with or without overlapping rotation by a rotation angle of 90° to 270°. For example, the at least two piece goods are spatially separated from the closed formation by lateral rotation from a linear movement path of the closed formation and brought into the respective defined first relative target position and/or target alignment with respect to the subsequently following piece goods of the formation. Lateral rotation is defined in particular as a combination of a rotation of the seized piece goods in combination with a lateral or diagonal displacement component. The displacement component has a defined angle other than zero relative to the transport direction of the piece goods of the formation. In particular, the displacement component ensures that the at least two piece goods in their target position and/or target alignment are not arranged in alignment with the piece goods of the formation.

Subsequently, for example, at least one of the piece goods seized by the manipulator can be seized again in immediate succession from this first target position and reach the second target position and/or target alignment by a further movement in a linear direction parallel or diagonally to the original transport direction and with or without overlapping rotation by a rotation angle of 90° to 270. In particular, a palletizable layer or layer arrangement or a pregrouping for a palletizable layer or layer arrangement is formed as a result of the piece goods being brought into their respective target position and/or target alignment in chronologically successive steps.

If there is talk of a rotation of the piece goods, this preferably refers to a rotation about a vertical axis, in particular vertically to the plane of transport for the piece goods that is provided by the transport device and/or horizontal conveying device. The axis does not necessarily have to intersect the center of gravity of a piece good, but can also be off-center, especially if several piece goods are rotating simultaneously. Preferably all piece goods seized simultaneously by the manipulator rotate around the same axis.

The method can be realized in an advantageous way by implementing the manipulation steps for the seizing and positioning of piece goods via a specific manipulator, preferably designed as a delta kinematics robot or parallel kinematics robot, or forming part of a delta kinematics robot or parallel kinematics robot.

A further option of the method in accordance with the invention may also provide that after release of a piece good in the first target position or after release of two or more piece goods in the first target position, their displacement can take place by piece goods still remaining with the manipulator in the direction of a target position deviating from or spaced apart from the first target position before these further piece goods still remaining in the manipulator are brought into the defined second target position.

In accordance with a preferred embodiment of the invention it is provided that adjacent areas of the clamping elements and/or gripping elements of the manipulator seize two or more piece goods moved one after the other from the closed formation and move them, whereby the clamping elements and/or gripping elements are designed for the selective release of individual piece goods at defined target positions while simultaneously maintaining the seizing and/or clamping of at least one adjacent piece good. Furthermore, in this context it may be provided that for conveying to at least one further second target position that is spaced apart from the first target position the clamping elements and/or gripping elements are in each case controlled, activated and/or moved in a different manner. This is described in particular in more detail in connection with the apparatus according to the invention.

A variant of the method according to the invention may provide that the seizing range of the manipulator and/or the manipulator is detected and monitored by at least one sensor described in more detail below in the context of the apparatus. This sensor monitoring can be used in particular for more precise control of the different areas of the manipulator in connection with the selective release and positioning of an individual seized piece good or a plurality of seized piece goods.

It is furthermore conceivable that at least one piece good, which has already been seized by the manipulator in a first manipulation step and has been brought into a first position or intermediate position, is brought into the defined target position and/or target alignment by being seized again by the manipulator. The first position taken up by the piece good therefore does not represent the final target position within the partial layer to be formed or within the pallet layer to be formed. The target position is only finally established in a later step of the method. Analogously it is conceivable that at least one piece good, which has been brought into the first position or intermediate position in a first step by being shifted by a further piece good, is being brought into the specified target position and/or target alignment by being seized again by the manipulator in the context of a further method step.

The method according to the invention may also provide that at least one further velocity component in relation to a transport speed of the closed formation is imparted to the seized piece goods, in particular to the at least one first seized piece good and to the at least one second piece good. It should be noted that the velocity component must not be negative to the speed of the piece goods within the formation. In the case of a negative velocity component, the at least one seized piece good would be moved against the transport direction of the transport device and/or the horizontal conveying device, which would lead to a collision between the at least one seized piece good and the subsequent foremost located piece good of the closed formation.

Furthermore, in the method in accordance with the invention, a directional component and/or rotary component can be imparted on the at least two piece goods seized in the first method step. It should be borne in mind that the directional component must not be directed in the direction opposite to the transport direction of the piece goods in the formation. Otherwise, there would be a risk of collision between the seized piece good and the subsequent foremost located piece good of the closed formation. In order to rotate the at least one seized piece good, the manipulator of the apparatus can, for example, be designed as a gripper head on a swivel joint and by rotating it about a defined angle of 90°, 180° or 270° change the alignment of the piece goods seized between the clamping elements and/or gripping elements, for example clamping jaws.

In further chronologically successive manipulation steps or method steps preferably repeated several times at least one transported piece good is seized from the closed formation in a clamping and/or force-locking and/or form-locking manner, spatially separated from the closed formation and brought into a respective defined relative target position and/or target alignment with respect to subsequent piece goods, resulting in a grouping for a palletizable layer or partial layer being formed from a plurality of piece goods. In particular, in further chronologically successive method steps repeated several times at least two piece goods are seized simultaneously by the manipulator from the closed formation in a clamping and/or force-locking and/or form-locking manner, are spatially separated from the closed formation and brought into a respective defined relative first target position and/or target alignment in relation to subsequent piece goods, wherein thereafter at least one of the at least two piece goods can be brought into a spaced second target position.

A further embodiment of the method provides that at least two piece goods are seized from the closed formation in a clamping and/or force-locking and/or form-locking manner, spatially separated from the closed formation and brought into a defined first target position and/or target alignment in relation to subsequent piece goods. In a subsequent method step, at least one of the at least two piece goods arranged in the first target position and/or target alignment is seized again in a clamping manner and is moved and/or rotated into a second target position and/or target alignment, while the at least one other of the at least two piece goods is moved by contact only from one side, i.e. not in a clamping manner, by the manipulator or by other piece goods into a third target position and/or target alignment.

The method step described or the method steps described above or even individual method steps described above are carried out in particular by an apparatus in accordance with the invention, in particular by a handling apparatus, which serves for handling piece goods moved one behind the other in at least one row, which apparatus comprises at least one first transport device and at least one manipulator. The at least one first transport device serves to feed the piece goods to a seizing range of the at least one manipulator, whereby the piece goods are arranged or moved directly following one another in a closed formation in a row, in particular approximately without spacing between each other. The first transport device, for example, is a horizontal conveyor, in particular a horizontal conveyor belt. From the first transport device the piece goods are further conveyed to a horizontal conveying device, being in particular in alignment with the first transport device, whereupon they are seized and in particular also released by the manipulator of the handling apparatus within its seizing range. The horizontal conveying device and the manipulator form in particular the grouping module of the handling apparatus with the seizing range, in which the respective piece goods are seized by the manipulator and are in particular also released.

The at least one manipulator is typically/preferably designed to seize and/or receive at least two piece goods in a clamping and/or form-locking and/or force-locking manner, the piece goods being supplied in a closed formation via at least one transport device into the seizing range of the manipulator. Furthermore, the manipulator is designed to separate and selectively transfer the piece goods into at least two different target positions and/or target alignments spaced apart from each other. In particular, the manipulator is designed for the selective transfer of at least one first piece good into a first target position and/or target alignment and for the selective transfer of at least one second piece good into a second target position and/or target alignment.

According to an embodiment, at least one manipulator can have at least two clamping elements and/or gripping elements arranged opposite each other, in particular in pairs opposite each other and adjustable against one another. The clamping elements and/or gripping elements cooperating with one another, in particular in pairs with one another, seize the respective piece goods in a clamping and/or form-locking and/or force-locking manner as well as separating the seized piece goods and selectively transferring them in the target position and/or target alignment. During the seizing of the piece goods, the clamping elements and/or gripping elements of the manipulator are aligned parallel to the transport direction of the infeeding piece goods.

After being brought into their respective defined target position the piece goods are being released by the at least two clamping elements and/or gripping elements arranged opposite one another. The clamping elements and/or gripping elements, which can be adjusted in relation to each other, permit rapid seizing, displacement, positioning and release of the piece goods at the desired speed with the desired positioning precision. Other manipulators can also be used advantageously, e.g. those which are designed as multi-axis robots, as parts of such multi-axis robots, as delta kinematic robot or so-called tripods.

In order to be able to selectively transfer individual piece goods or sub-groups of a jointly seized group of piece goods into their respective target positions and/or target alignments, the clamping elements and/or gripping elements of the manipulator are preferably designed in such a way that adjacent areas of the clamping elements and/or gripping elements can selectively release individual piece goods at specific target positions. At the same time, the seizing and/or clamping of at least one adjacent piece good is maintained in order to subsequently transfer this piece good into at least one further second target position which is spaced apart from the first target position. This is achieved in particular by the fact that the adjacent areas of the clamping elements and/or gripping elements can each be controlled, activated and/or moved in a different manner.

Preferentially the clamping elements and/or gripping elements for clamping, form-locking, and or force-locking seizing and/or for selective release of at least two adjacent piece goods are subdivided into at least two separately controllable sections. In particular, each of the different clamping sections of the clamping elements and/or gripping elements can be assigned its own drive, for example a servo motor. According to an alternative embodiment, the drives of the clamping elements and/or gripping elements may be controllable depending on each other. In this case it would be conceivable that several piece goods are released in or on reaching a first target position. After release, the manipulator or the at least one clamping device and/or gripping device can again seize at least one of the piece goods released upon reaching the first target position and after seizing move this piece good in the direction of the second target position. This can be done in the meantime (between release and re-seizing), for example, by shifting the manipulator relative to the piece goods released in the first target position.

The manipulator can in particular be designed for single-row or multi-row seizing of piece goods. For this purpose, the clamping elements and/or gripping elements can be arranged either in a single row or in several rows. Within a row, the clamping elements and/or gripping elements may also have separately controllable gripping sections. It is conceivable, for example, that the piece goods are delivered on several first transport devices in parallel rows or lanes. In this case, the clamping elements and/or gripping elements of the manipulator can be designed in such a way that they can seize several parallel rows of piece goods at the same time. In particular, it must be taken into account whether or not there is a space between the parallel rows of incoming piece goods. The manipulator can, for example, have two rows of parallel clamping elements and/or gripping elements, wherein these can be controlled for the seizing of piece goods via a common drive or independently of each other via two drives.

According to an embodiment, at least one sensor is assigned to the seizing range and/or to the manipulator for the detection and monitoring of the selective actuation, activation and/or movement of the clamping elements and/or gripping elements of the manipulator. The sensor can, for example, be formed by an optical sensor, in particular by a camera with downstream-disposed image evaluation. In principle, however, other sensor variations can also be used, e.g. ultrasonic sensors or the like.

The manipulator and other machine components of the apparatus are preferably controlled via a control device of the apparatus or handling apparatus. In particular this controls the at least one manipulator for clampingly and/or force-lockingly and/or form-lockingly seizing the at least two piece goods, for their spatial separation from the closed formation and for bringing at least one piece good into the first specified target position and/or target alignment and for bringing at least one further piece good into the second specified target position and/or target alignment spaced apart from the first target position. Preferably, the control device contains stored information on a grouping to be formed by a plurality of piece goods in order to generate a palletizable layer, wherein the respective target positions and/or target alignments of the piece goods form part of the information and assign a respective specific position and/or relative orientation to the respective piece goods within the respective grouping.

The control device may in particular be an electronic and/or programmable control device, such as a PLC. In this control device different recipes/data can be stored, with each of which different piece goods—for example, six-packs and four-packs—can be clamped, released and/or realized. The control device may in particular contain the following recipes/data:

different target positions and/or target alignments, in particular whether the piece goods reach the target positions and/or target alignments with rotation or without rotation, and/or information on the targeted layer scheme, i.e. arrangement of piece goods in relation to each other in the respective target position, and/or number of formations in the infeed of the apparatus, in particular single-row or multi-row infeed of piece goods etc.

The manipulator can be controlled via the control device in such a way that the at least one clamping device and/or gripping device with the clamping elements and/or gripping elements approaches the at least two different target positions with a time delay, in particular one after the other, and releases in each case at least one of the piece goods seized from the formation when reaching a respective one of the at least two different target positions. The at least two piece goods are preferably manipulated in a time-delayed manner within the context of a continuous working movement of the clamping elements and/or gripping elements, whereby a high throughput can be achieved.

The apparatus may include, alternatively or in addition to the characteristics described above, one or more characteristics and/or properties of the previously described method. The method may also alternatively or additionally have one or more features and/or characteristics of the described apparatus.

BRIEF DESCRIPTION OF THE FIGURES

In the following passages, the attached figures further illustrate exemplary embodiments of the invention and their advantages. The size ratios of the individual elements in the figures do not necessarily reflect the real size ratios. It is to be understood that in some instances various aspects of the invention may be shown exaggerated or enlarged in relation to other elements to facilitate an understanding of the invention.

FIGS. 3 to 32 schematically show a chronological sequence of a method according to the invention for handling piece goods moved one behind the other in two parallel rows by a corresponding handling apparatus for preparing a layer of piece goods according to FIG. 1.

Figure 1:
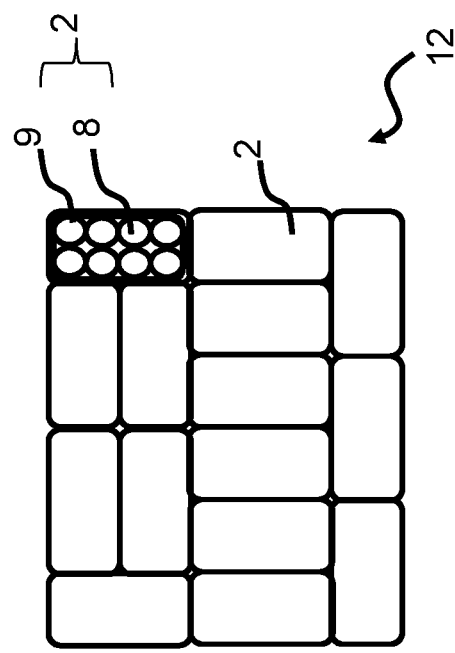
FIG. 1 schematically shows the arrangement of piece goods as a layer.

The same or equivalent elements of the invention are designated using identical reference characters. Furthermore, and for the sake of clarity, only the reference characters relevant for describing the individual figures are used. It should be understood that drawings of the detailed description and specific examples of the embodiments of the apparatus and of the method according to the invention are intended for purposes of illustration only and are not intended to limit the scope of the invention or of the inventive idea.

DETAILED DESCRIPTION OF THE INVENTION

FIG. 1 schematically shows the arrangement of piece goods 2 as layer 12, as they are to be arranged, for example, for palletizing and further processing. In the illustrated embodiment, the piece goods 2 are formed by eight bottles 8 each, which are combined into bundles by a shrink film 9.

FIGS. 2A and 2B show the asymmetric loading of a manipulator 5, which can seize up to three piece goods 2* between the clamping jaws 22. If the manipulator 5 is loaded with only one or two piece goods 2, the arrangement of the piece goods 2* is carried out eccentrically in relation to the clamping jaws 22, that is to say, the first vertical symmetry plane S2* is spaced apart from the second vertical symmetry plane S5 of the manipulator 5. If the manipulator 5 is, in contrast, completely loaded with three piece goods 2*, then the first vertical symmetry plane S2* and the second vertical symmetry plane S5 of the manipulator 5 coincide.

Figure 2:
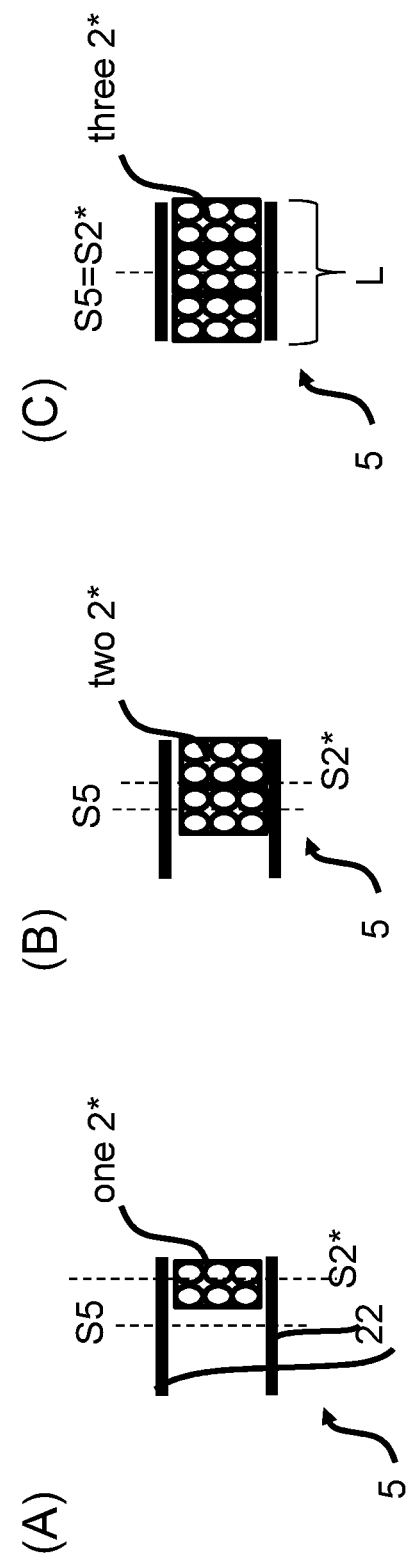
FIGS. 2A to 2C each show the seizing of a different number of piece goods by a manipulator of the handling apparatus.

If "vertical symmetry plane" is referred to in the present context, relating mainly to the positions of the piece goods 2, 2* or to their relative positions to the manipulator 5 or to its clamping elements and/or gripping elements these vertical symmetry planes are intended to be understood, according to the definition, as oriented perpendicular or approximately perpendicular to the horizontal conveying plane of a horizontal conveying device 6 (cf. FIG. 2). These symmetry planes, that is to say, the first symmetry plane, the second, and, if applicable, further symmetry planes, are expediently also oriented perpendicular to the horizontally extending transport direction TR and/or about perpendicular to a longitudinal extension direction of the closed formation F. If the reader imagines this transport direction TR as a horizontal vector arrow extending parallel to the horizontal support surface of the horizontal conveying device 6 as well as parallel to the transport device 3 that normally likewise extends horizontal or in sections horizontal, then this vector arrow pierces the perpendicular symmetry planes likewise essentially in perpendicular. As mentioned, these at least two symmetry planes—one is associated with the piece goods 2, the other with the manipulator 5—are located at a certain distance from one another if the manipulator 5 is loaded asymmetrically or one-sided. If the symmetry planes coincide or approximately coincide, this represents the special case of the completely loaded and/or symmetrically or centrally loaded manipulator 5, as is illustrated in FIG. 2C, for example.

FIGS. 3 to 32 schematically show a chronological sequence of a method according to the invention for handling piece goods 2 moved one behind the other in two parallel rows 1, 1a, 1b by a corresponding handling apparatus 10 for preparing a layer 12 of piece goods 2 according to FIG. 1.

The handling apparatus 10 comprises two first transport devices 3, 3a, 3b arranged in parallel, by which directly successive piece goods 2 are transported in two parallel rows 1, 1a, 1b without interruption and/or at continuous transport speed v3 into a seizing range 4 of at least one movable, displaceable and/or rotatable manipulator 5 of the handling apparatus 10. In particular, it is provided that exactly one seizing range 4 of a manipulator 5 of the handling apparatus 10 is assigned to the two parallel first transport devices 3a, 3b. The transport devices 3a, 3b are each formed, for example, by a conveyor belt or another suitable conveying device, on which the piece goods 2 are preferably transported in a single row, whereby there is no or only a slight gap between directly successive piece goods 2, the gap being process-related. As shown in the FIG. 3 and subsequent figures, the piece goods 2 thus continuously enter the seizing or detection range 4 of the manipulator 5, thereby moving within each of the rows 1a, 1b in a so-called closed formation F, Fa, Fb.

FIGS. 3 to 32 illustrate in particular the continuous transport of rows 1, 1a, 1b or formations F, Fa, Fb without gaps in transport direction TR into the seizing range 4 of the handling device 10. In particular, the piece goods 2 of the particular row 1a, 1b are further transported in the seizing range 4 without interruption and at unchanged transport speed. In particular, a horizontal conveying device 6 moving at a speed v6 is assigned to seizing range 4. The speed v6 of the horizontal conveying device 6 corresponds in particular to the transport speed v3 of the transport devices 3a and 3b. The piece goods 2 arriving in parallel rows 1a, 1b via the transport devices 3a, 3b are transferred to the horizontal conveying device 6 by the dynamic pressure of the subsequent piece goods 2 and are conveyed further on without interruption.

It is also possible that the piece goods 2 are transported to the seizing range 4 of the manipulator 5 in several rows, in particular in several parallel rows 1a, 1b, on a single, common transport device 3 (not shown). The parallel rows 1a, 1b can be transported on the transport device 3 at a distance from each other or largely without distance from each other.

Taken together the horizontal conveying device 6 and the at least one manipulator 5 arranged above the horizontal conveying device 6 are also referred to as the grouping module 20 of the handling apparatus 10.

The manipulator 5 is designed for receiving piece goods 2, 2\* in a clamping and/or form-locking and/or force-locking manner within the seizing range 4. As illustrated in FIG. 4, according to its maximum seizing capacity the manipulator 5 first seizes three piece goods 2 from the closed formation Fa arriving via the transport device 3a. The piece goods 2 seized by the manipulator 5 are referred to below with the reference characters 2\* for the purpose of distinguishing them from the piece goods 2 of the formation F. The manipulator 5 separates the seized piece goods 2\* from the single row formation Fa and transfers the group of three seized piece goods 2\* into a position. Thereby the group of three seized piece goods 2\* is distanced by the manipulator 5 from the formation Fa of piece goods 2 especially by shifting in transport direction TR.

In a further method step shown in FIG. 5, the manipulator 5 opens in a first position to release the three seized piece goods 2, 2\*. Afterwards the manipulator 5 is positioned above two of the three piece goods 2\* that have been shifted in relation to the formation Fa in such a way that it can now seize them asynchronously and then transfer them to another position. The piece good 2\* that is not seized again is now located in its first target position P1.

The manipulator 5, which has now only seized two piece goods 2\*, transfers them to a second target position and/or target alignment P2. Thereby the manipulator 5 rotates by 90° about a preferably approximately vertical axis located between the respective at least one piece good 2\* seized in a clamping and/or force-locking and/or form-locking manner and the target position P2. If applicable, this rotary movement may also be superimposed by a shifting movement. In order to create a gap between the piece good 2\* arranged in target position P1 on the horizontal conveying device 6 and the piece goods 2\* seized again by the manipulator 5, it may also be provided that these are briefly retained in their position by the manipulator 5 while the piece good 2\* in the target position P1 is moved further on the horizontal conveying device 6 with the speed v6.

As shown in FIG. 7, the manipulator 5 detaches itself from the piece goods 2\* transported to the target position P2 in order to seize three piece goods 2, 2\* from the incoming formation Fb as shown in FIGS. 8 to 10 and to transport these piece goods 2, 2\* with a 90° rotation into a position on the horizontal conveyor 6.

This position corresponds to a target position P3 for one of the three seized piece goods 2\*. In the method step shown in FIG. 10, the manipulator 5 is opened and is positioned over two of the three piece goods 2\* that are shifted in relation to the formation Fa, in order to seize them asynchronously and then transfer them to a further position. The piece good 2\* that is not seized again is now located in its target position P3.

The manipulator 5, which has now seized only two piece goods 2\*, transfers them according to FIGS. 11 and 12 into a further position which represents the target position and/or target alignment P4 for one of these two piece goods 2\*. As shown in particular in FIG. 12 the manipulator 5 now seizes only the other one of the two piece goods 2\* and transfers it according to FIG. 13 into a target position and/or target alignment P5.

Figure 36:
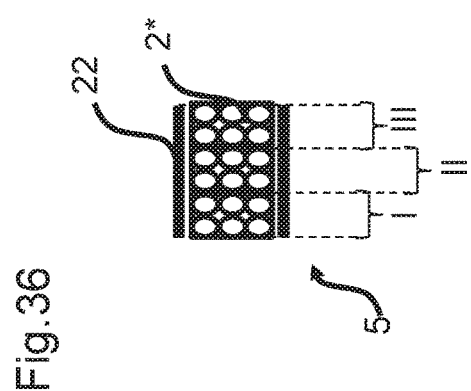
FIG. 36 schematically shows a subdivision of a manipulator of the handling apparatus.

The selective release of individual piece goods 2, 2\* at their respective target positions P3, P4, P5 as shown in FIGS. 10 to 13 can be carried out in particular by a manipulator 5, whose clamping jaws 22 are divided into adjacent clamping areas I, II and III (see FIGS. 10 and 36). In particular, the adjacent clamping areas I, II and III of the clamping jaws 22 can selectively release individual piece goods 2, 2* at defined target positions P3, P4, P5, whereby at the same time the seizing and/or clamping of at least one neighboring piece good 2, 2* is maintained, in order to subsequently transfer this piece good 2, 2* into at least one further second target position P4, P5 spaced apart from the first target position P3. In FIG. 10, for example, a piece good 2, 2* is selectively released by the clamping area I of the manipulator 5 in the target position P3, while the two piece goods 2, 2* that are clamped in the clamping areas II and III respectively remain clamped. Afterwards the manipulator 5 moves into a new specified target position and according to FIG. 11 selectively releases the piece good 2, 2* in this target position P4, which piece good 2, 2* was being clamped in the central clamping area II of the clamping jaws 22. According to FIG. 12 the manipulator 5 transfers the remaining piece good 2, 2* which is clamped in the clamping area III to the target position P5 and releases it there according to FIG. 13 in order to seize further piece goods 2 from the incoming formation F.

According to this embodiment, the adjacent clamping areas I, II and III of the clamping jaws 22 of the manipulator can each be controlled, activated and/or moved in a different manner. A separate drive (not shown), for example a servo-motor, can be assigned to each of the different clamping areas I, II and III. According to an alternative embodiment, the drives of the different clamping areas I, II and III can be controllable depending on each other. In this case it would be conceivable that several piece goods 2, 2* are released in or on reaching a target position. After release, the manipulator 5 can seize again at least one of the piece goods 2, 2* that have been released when reaching the target position and after seizing subsequently move it in the direction of the further target position. This can be done, for example, by shifting the manipulator 5 in the meantime (between release and re-seizing) relative to the piece goods 2, 2* released in the previous target position.

The manipulator 5 subsequently disengages itself from the piece good 2* that has been conveyed to the target position P5 in order to asymmetrically pick off two piece goods 2* from the formation Fa, as shown in FIG. 14, and to convey these piece goods under rotation by 90° into a target position and/or target alignment P6 shown in FIG. 15.

The manipulator 5 then disengages itself from the piece goods 2* conveyed to the target position P6 and, in a further manipulation step, does not now grip the foremost arriving piece goods 2 of the closed formation Fb. Instead, the manipulator 5 seizes the fourth, fifth, and sixth piece good 2 of the infeeding closed formation Fb. Thus, in particular, the piece goods 2* of the formation Fb that are seized by the manipulator 5 are preceded by three other piece goods 2. The three piece goods 2 seized in a clamping and/or force-locking and/or form-locking manner by the manipulator 5 are now spatially separated from the closed formation Fb and—as shown in FIG. 18—are brought into a specified relative target position and/or target alignment P7 in relation to subsequent piece goods 2 of the formation Fb by shifting in transport direction TR. In this context, the three preceding piece goods are likewise repositioned. Thus, three piece goods 2, 2* are seized by the manipulator in this manipulation step, but a total of six piece goods 2, 2* are shifted into a target position P7, in which case the piece goods 2 that are not seized by the manipulator 5 are pushed into the target position P7 by a surface contact between a piece good 2* that is seized by the manipulator 5 and a piece good 2 that is not seized by the manipulator 5.

The total of six piece goods 2, 2* reach the target position P7, in particular, by a movement in linear direction. Preferably, the total of six piece goods 2, 2* in their target position P7 are arranged in alignment with the closed formation Fb.

After the target position P7 has been reached and the manipulator 5 has disengaged from the group of seized piece goods 2* (cf. FIG. 19), the surface contact between the piece good 2* seized by the manipulator and the piece good 2 not seized by the manipulator 5 is maintained.

In the FIGS. 19 to 21 it is shown that the manipulator 5 now moves again towards the incoming closed formation Fa and, according to FIG. 21, seizes the foremost three piece goods 2, 2* of the formation Fa and shifts them in the transport direction TR.

According to the method step shown in FIG. 22, the manipulator 5 opens and thereby places one of the piece goods 2* in a target position P8 on the horizontal conveying device 6, while it asynchronously seizes the other two piece goods 2* again. As shown in FIG. 23, another piece good 2* is positioned on the horizontal conveying device 6 in a target position P9 at a distance from the piece good 2* arranged in the target position P8. The distance is necessary because the piece goods 2* arranged in positions P1 to P8 form a first target layer 12-1 according to FIG. 1. The piece good 2* arranged in position P9 is already part of a second target layer 12-2 to be formed, which can at least partly be seen in particular in FIG. 32.

The piece goods 2*, which are arranged in their target positions P1 to P8 largely as a loose target layer 12-1, are pushed together with suitable sliders or similar in a following step that is not shown in order to form a closed target layer 12-1 according to FIG. 1. This closed target layer 12-1 can then be transferred, for example, to a pallet for further processing.

FIGS. 23 to 32 represent some method steps during the formation of a second target layer 12-2. After the second piece good 2* of the group of three piece goods 2* seized from the formation Fa according to FIG. 21 has been positioned in the target position P9, the remaining piece good 2* is seized again asynchronously and transferred to a target position and target alignment P10 by a 90° rotation, in particular in connection with a lateral displacement.

As shown in FIG. 25, the manipulator 5 subsequently seizes the three foremost piece goods 2, 2* of the formation Fa further entering the horizontal conveying device 6 and moves them under rotation into a position at which position two piece goods 2* are now deposited at their target position and target alignment P11, while the third piece good 2* is moved under renewed rotation into its target position and target alignment P12 as shown in FIGS. 28 to 30.

The manipulator 5 then detaches itself from the piece good 2* that has been moved to the target position P12 and, in a further manipulation step, does not seize the foremost incoming piece goods 2 of the closed formation Fb. Instead, the manipulator 5 seizes the fourth, fifth and sixth piece good 2 of the incoming closed formation Fb. In particular, three further piece goods 2 are now in front of the piece goods 2* of the formation Fb that have been seized by the manipulator 5. The three piece goods 2 which are seized by the manipulator 5 in a clamping and/or force-locking and/or form-locking manner are now spatially separated from the closed formation Fb and—as shown in FIG. 31—brought into a defined relative target position and/or target alignment P13 in relation to the subsequent piece goods 2 of the formation Fb by shifting in the transport direction TR. Thereby the three leading piece goods are also repositioned. Thus, three piece goods 2, 2* are seized by the manipulator in this manipulation step, but a total of six piece goods 2, 2* are shifted into a target position P13, in which case the piece goods 2 that are not seized by the manipulator 5 are pushed into the target position P13 by a surface contact between a piece good 2* that is seized by the manipulator 5 and a piece good 2 that is not seized by the manipulator 5.

The total of six piece goods 2, 2* reach the target position P13, in particular, by a movement in linear direction. Preferably, the total of six piece goods 2, 2* in their target position P13 are arranged in an alignment with the closed formation Fb.

After the target position P13 has been reached and the manipulator 5 has disengaged from the group of seized piece goods 2* (cf. FIG. 32), the surface contact between the piece good 2* seized by the manipulator and the piece good 2 not seized by the manipulator 5 is maintained.

The further manipulation steps for forming the second partial layer 12-2 are not shown. These are comparable to the principle shown in FIGS. 3 to 32, whereby the number of piece goods 2* seized by the manipulator 5 is always selected according to the principle of time optimization and/or path optimization.

In the described manipulation steps, the seized piece goods 2* are in each case preferably transferred, pushed, and/or rotated in one single, in particular, interruption-free manipulation step into the target position and/or target alignment P1 to P13. However, it can also be advantageous that the manipulator 5 seizes more piece goods 2* than have to be arranged in a respective target position. The manipulator 5 places the piece goods 2* at a position, in which position at least one of the piece goods 2* occupies the desired target position. It then seizes the other piece goods 2* again, whereby the renewed seizing is preferably asynchronous, as the full seizing capacity of the manipulator is no longer exploited. The piece goods 2* that have been seized again are now transferred to their target position by further movement, for example rotation and/or displacement relative to the horizontal conveying device, and positioned there.

Here it can be provided that the manipulator 5, for example, lifts up the seized piece goods 2*, transports them to a target position and sets them down again on the horizontal conveying device 6 within the seizing range 4. Alternatively, it may be provided that the manipulator 5 shifts the piece goods 2* on the horizontal conveying device 6, in particular by applying a velocity component and/or a directional component to the seized piece goods 2*. In particular, in the case of simultaneous shifting of piece goods seized by the manipulator 5 and at least one other piece good 2 in surface contact with the seized piece good, essentially no lifting of the seized piece goods 2* is provided. Instead, these are only shifted on the horizontal conveying device 6.

In the manipulation steps described here, it is particularly intended that the manipulator 5, at least when seizing the piece good 2*/the piece goods 2* and releasing it/them in the respective target position and target alignment, moves at a speed which corresponds approximately or exactly to the transport speed v3 used for moving the closed formations Fa, Fb of piece goods 2.

The target positions each represent a relative position compared to the formations Fa or Fb. Since the transport devices 3a, 3b and thus the formations Fa, Fb move at the same speed as the horizontal conveying device 6, the relative distance between the piece goods 2* in their respective target position and a piece good 2 of the formations Fa, Fb not yet seized by the manipulator 5 always remains the same in the further process, although all piece goods 2, 2* continuously continue to move.

In the time window between the seizing of piece goods 2* by the manipulator 5 and their release in the respective target position, the speed of the manipulator 5 is increased compared to the transport speed v3 of the formations Fa, Fb. The movement direction of the manipulator 5 when transporting the piece goods 2* of formation F into a target position results, for example, from a first movement component parallel to the transport direction TR of formation Fb and from a second movement component perpendicular to the transport direction TR of formation F. Thereby, the piece goods 2* seized by the manipulator 5 can be moved into a defined target position within the seizing range 4 of the manipulator 5, which target position is located in the transport direction TR at a distance in front of the formation F and laterally displaced to the formation F. If the second movement component perpendicular to the transport direction TR of formation F equals zero, the seized piece goods 2* are shifted to a position that is located in alignment with the respective formation F.

It can be furthermore provided that the manipulator rotates about an axis of rotation perpendicular to the plane of the horizontal conveying device 6 and thereby effects a corresponding repositioning of the seized piece goods 2*. Depending on whether additional movement components are applied to the manipulator 5, the piece goods 2* moved in such a manner are disposed in an alignment with the particular formation F, or they are disposed laterally shifted in relation thereto.

According to another embodiment not shown here, it may be provided that the manipulator 5, after shifting a group of seized piece goods 2, 2* and simultaneously shifting at least one piece good 2, 2* not seized by the manipulator 5, which is in surface contact with one of the piece goods 2, 2* seized by the manipulator 5, continues to transfer the group of seized piece goods 2, 2* after the shifting step. This can be achieved, for example, by applying a further directional component to the seized piece goods 2, 2*, for example, perpendicular to the transport direction TR of the formation F. Alternatively or additionally a rotation of the manipulator 5 can cause a rotation of the seized piece goods 2, 2*, whereby the piece good 2 not seized by the manipulator 5 does not undergo this rotation but is transported further on with the speed v6 of the horizontal conveying device 6.

According to a further non-illustrated embodiment, it can be provided that the manipulator 5 after shifting a group of seized piece goods 2* and at least one piece good 2 not seized by the manipulator 5, which non-seized piece good 2 is in surface contact with a seized piece good 2*, disengages from the group, then again seizes at least one piece good 2, 2* of this group and rotates and/or shifts it, or the like, in relation to the group.

A manipulator 5 with seized piece goods 2* can also be used for shifting at least one piece good 2, which has already been disposed in a target position in a previous step, into a new target position by surface contact between the piece good 2* seized by the manipulator 5 and the piece good 2, which has already been disposed on the horizontal conveying device 6 in a first target position. The manipulator 5 subsequently releases the seized piece good 2* in the new target position such that a surface contact between the piece good 2 already disposed in a target position in a previous step and the further piece good 2* is maintained.

During the positioning of the piece goods 2* seized by the manipulator 5, the at least one transport device 3 and the horizontal conveying device 6 are further operated continuously.

The speed v3, v6 is selected in such a way that the manipulator 5 has sufficient time to move the piece goods 2* within its available working range. The manipulator 5 preferably consists of a delta kinematics robot in order to realize highly dynamic displacement movements and to enable cycle times that are as fast as possible.

In the method described here, the groups of piece goods 2* are formed according to the grouping, partial layer or layer to be formed during the grouping process/positioning process. In particular, grouping and positioning is possible within a single method step and by a single corresponding apparatus (in particular the movable, displaceable and/or rotatable manipulator 5 as part of the apparatus). This represents a significant difference to the prior art, in which groups are formed first, for example by arranging suitable conveyors which are each driven at different speeds, which groups are then positioned and/or rotated in a further method step in accordance with the layer to be formed.

If in the present case or generally in the context of the present invention there is generalized talk of a manipulator 5, the part of the manipulator 5 intended to transfer the at least one piece goods 2, 2* into the target position P and/or target alignment, for example, may be a tool head, a gripper head or the like, which, for example, is mounted and supported on movable cantilever arms, which cantilever arms in turn are typically mounted and fixed on a frame or framework or the like. Such a manipulator suspension or manipulator arrangement—also known as a parallel kinematic arrangement—enables the desired mobility of the head (also: of the manipulator), which can seize, shift, position, place, rotate, etc. the piece goods 2, 2* in the desired manner in order to reach the respective target positions P and/or target alignments of the piece goods 2, 2*. However, other suitable manipulator configurations are also possible, e.g. those with guided gantry robots or similar. These other manipulator configurations can optionally refer either to one, several or all embodiments mentioned in the context of the present figure description and/or the entire description of the invention.

Figure 33:
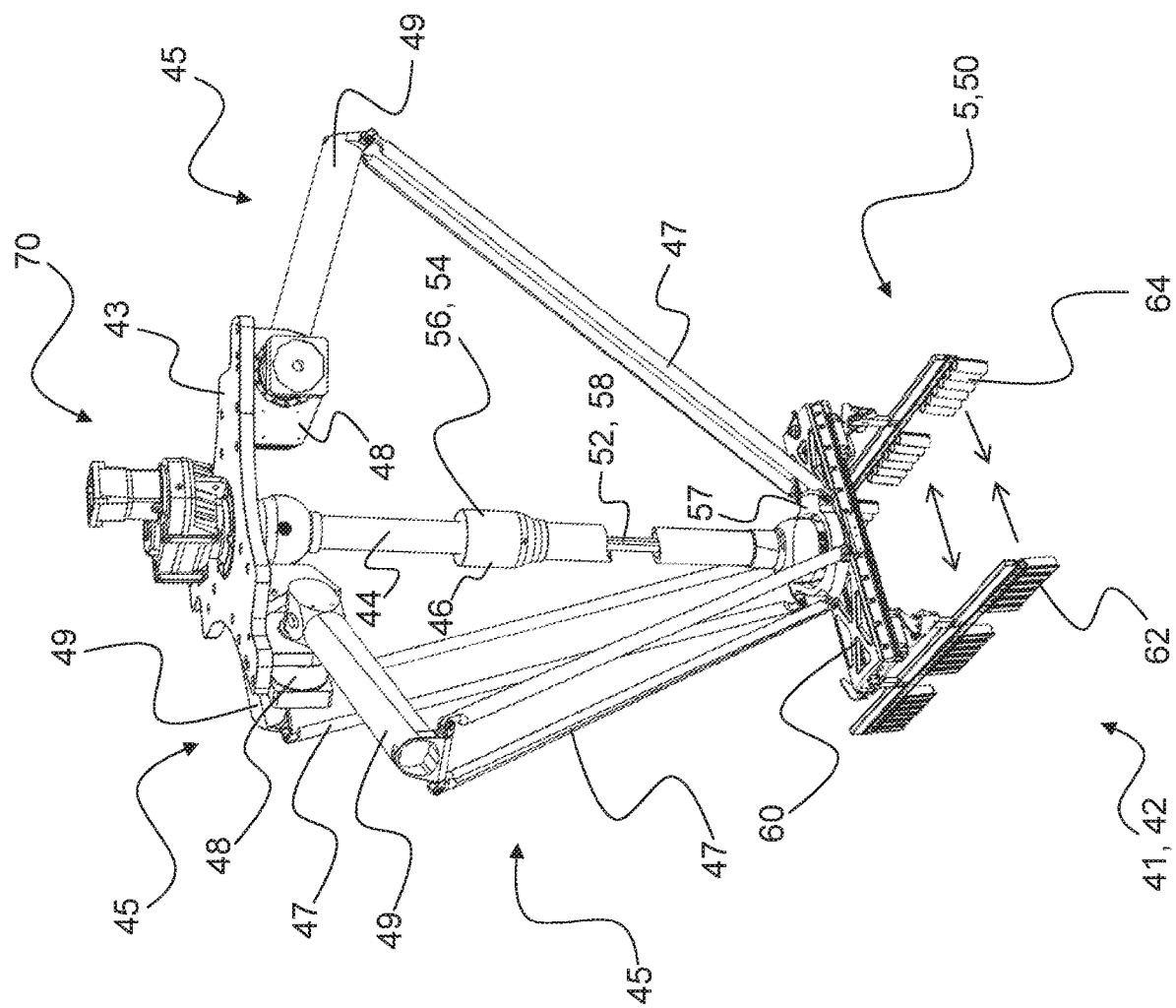
FIG. 33 shows a schematic perspective view of an embodiment of a handling apparatus and/or manipulation apparatus for carrying out a variant or a plurality of variants of the method according to the invention.
Figure 34:
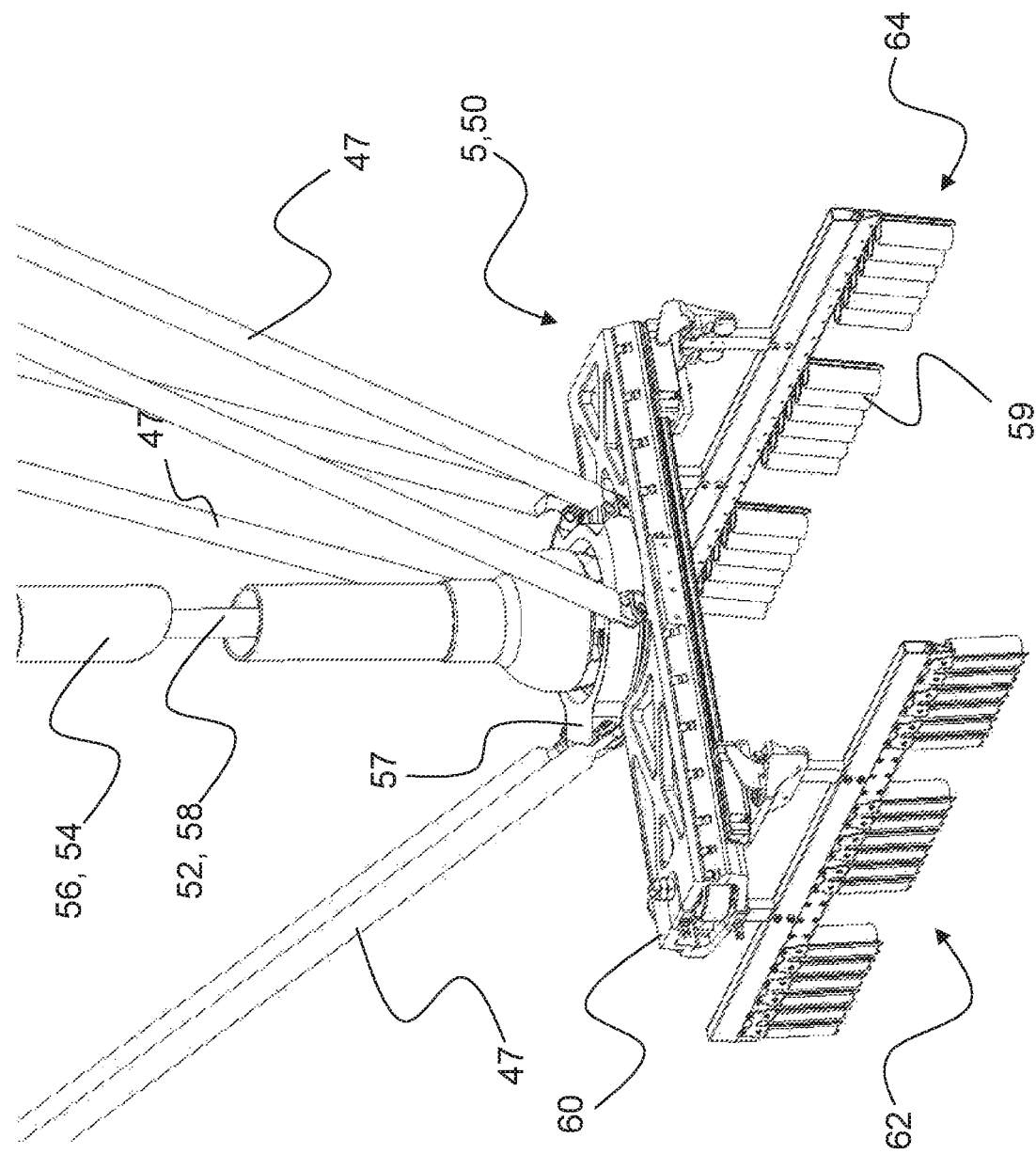
FIG. 34 shows a schematic detailed view of a lower part of the apparatus from FIG. 33.
Figure 35:
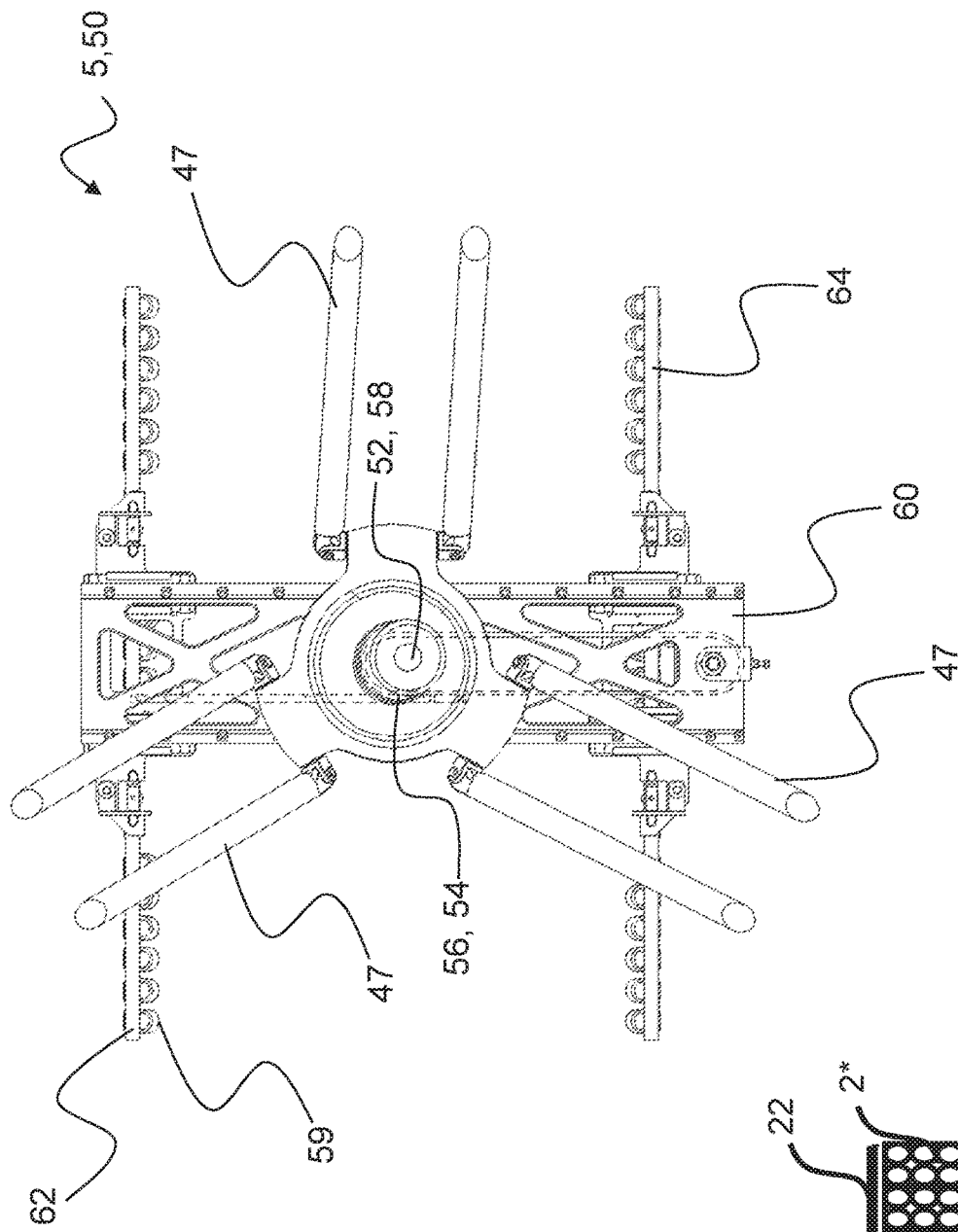
FIG. 35 shows a schematic cross-sectional illustration through the apparatus from the exemplary embodiment according to FIG. 33 and FIG. 34.

FIGS. 33 to 35 show different views of an embodiment of a manipulator 5, 50 of a handling apparatus 10 and/or manipulation apparatus (according to one of the previous figures) for carrying out a variant or a plurality of variants of the method according to the invention; in particular, FIG. 33 shows a schematic perspective view; FIG. 34 shows a schematic detailed view of a lower part of the apparatus from FIG. 33; and FIG. 35 shows a schematic cross-sectional illustration through the apparatus from the exemplary embodiment according to FIG. 33 and FIG. 34.

By way of introduction it is pointed out here that the embodiment variants of the apparatus for carrying out at least some variants of the method according to the invention as explained in the FIGS. 33 to 35 relate to a delta robot, a so-called tripod, or to a delta kinematic robot with three positioning arms of the same type which can form a part of a handling device or of a manipulator for handling, rotating, shifting, or receiving articles, piece goods, or bundles, or which can contain this handling device or this manipulator. In terms of a possible design for the delta robot or tripod of its construction, its mode of operation, and its movement range, the disclosure of DE 10 2013 106 004 A1 is referred to, with reference hereby being made to the full content of the disclosure. A detailed description of the movement modes, the drives for the three positioning arms, etc. is therefore dispensed with at this point. The apparatus 41 according to FIG. 33 to FIG. 35 could generally also have four positioning arms of the same type.

The robot forming or containing the apparatus 41, which robot at the same time contains or comprises the handling device or the manipulator, as applicable, or can form a part thereof is in the following generally referred to by the reference character 42. It should be noted that the robot referred to by the reference character 42 can also be referred to as delta robot 42, as delta kinematic robot 42, as parallel kinematic robot 42, or also as tripod 42 (cf. FIG. 33 in this connection).

FIG. 33 shows a schematic perspective view of an embodiment of an apparatus 41 or of the delta kinematic robot 42, as applicable, for carrying out the method according to the invention. The apparatus 41 or the delta kinematic robot 42, as applicable, is configured to grip, rotate, and relocate beverage containers, which have been assembled to bundles and which are not illustrated in FIG. 33. The apparatus 41 or the delta kinematic robot 42, as applicable, can however be used likewise for gripping, rotating, and relocating any type of articles or piece goods.

As is discernible in FIG. 33, the apparatus 41 or the delta kinematic robot 42, as applicable, has an upper suspension 43. Three positioning arms 45 are fastened to the upper suspension 43, each so as to be rotatable by an associated drive 48. The rotating movement of the positioning arms 45 in this context is carried out such that their axes of rotation run parallel to each other. Furthermore, the three positioning arms 45 consist of at least two arm sections 47 and 49, which are swivelable relative to each other, with the lower arm sections 47 or also lower arms 47 each being formed from two linkages oriented parallel to each other. The upper arm section 49 or also upper arm 49 is in each case linked to its particularly associated drive 48 or is flange-mounted to its particularly associated drive 48. In addition, the three positioning arms 45 can be moved independently of one another. For this purpose, all drives 48 are linked to a control unit, which specifies the movement of the positioning arms 45 and controls the drives 48.

At the lower end of the three positioning arms 45, a manipulator 50 is linked to the three positioning arms 45 such that the manipulator 50 can be moved for handling articles by a movement of the three positioning arms 45. The control unit not illustrated in FIG. 33 therefore specifies the movement of the positioning arms 45 depending on a position provided for the manipulator 50 for gripping and handling articles. All of the three positioning arms 45 are mechanically coupled with a base 60 of the manipulator 50 by a support ring 57. The mechanical connection or coupling between the support ring 57 and the base 60 of the manipulator 50 is formed to allow a rotation of the manipulator 50 in relation to the support ring 57. The support ring 57 can also be referred to as tool center point of the apparatus 41.

The manipulator 50 is non-rotatingly flange-mounted approximately centrally to a linear guide 56, in which case the linear guide 56 is formed as first shaft 54; and the manipulator 50 can thus be rotated via the first shaft 54.

Furthermore provided is an actuating device 52 formed as second shaft 58, by which clamping jaws 62 and 64 can be controlled to close and open. The axes of rotation of the first shaft 54 and of the actuating device 52 formed as second shaft 58 are identical. The first shaft 54 and the second shaft 58 are oriented or disposed coaxially in relation to each other. Since the manipulator 50 or the manipulator clamping jaws 62 and 64 located opposite each other, as applicable, can be controlled via the actuating device 52 formed as second shaft 58, no pneumatic, hydraulic, or electrical line connections are necessary for connecting to the manipulator 50 for the purpose of controlling the manipulator 50 or the clamping jaws 62 and 64.

Herein lies the advantageous possibility of rotating the manipulator 50 together with the manipulator clamping jaws 62 and 64 via the first shaft 54 by more than 360°, since there are no line connections that would impede a complete rotation. Compared to the apparatuses known from the prior art, the throughput in handling articles can hereby be significantly improved, since the manipulator 50 does not need a return rotation in order to be transferred back into an initial orientation.

The manipulator 50 shown in FIG. 33 has single row clamping elements and/or gripping elements, in particular clamping jaws 62, 64. Alternatively, it is possible that a manipulator 50 comprises several parallel clamping elements and/or gripping elements, i.e. in particular that the manipulator 50 is designed with multiple rows. In this case, a second pair of clamping jaws (not shown) would be located parallel to the first pair of clamping jaws 62, 64. According to one embodiment, in order to pick up or release piece goods the clamping jaws of the second pair of clamping jaws can move towards each other or away from each other analogously to the described clamping jaws 62, 64. The two pairs of clamping jaws can, for example, be controlled via a common drive. Alternatively, each pair of clamping jaws can have its own drive and the two pairs of clamping jaws can preferably be controlled independently of each other. Alternatively, it can be provided, that a middle clamping jaw is designed stationary, so that the two pairs of clamping jaws share this middle clamping jaw. The other clamping jaw of the two pairs of clamping jaws is in each case thus movable in the direction of the fixed clamping jaw or in the direction opposite to the fixed clamping jaw. Here, too, it can be provided that the respective movable clamping jaws are controlled via a common drive or can be moved independently of each other via their own drives.

As just mentioned, the two clamping jaws 62 and 64 in the embodiment shown in FIG. 33 can be relocated relative to each other or also moved toward each other or away from each other by a rotation of the actuating device 52 formed as second shaft 58. In the present context, the particular movement of the clamping jaws 62 and 64 when controlling the actuating device 52 formed as second shaft 58 is indicated by arrow-based illustration. Both clamping jaws 62 and 64 are fastened to the base 60 of the manipulator 50 in a hanging and linearly movable manner. A control of the clamping jaws 62 and 64 is carried out by transmission steps of a gearing mechanism in contact with the second shaft 58, which transmission steps are not discernible in FIG. 33, and which transmit a torque of the second shaft 58 to a positioning movement of the clamping jaws 62 and 64.

The linear guide 56 or the first shaft 54, as applicable, comprises two housing parts 44 and 46, which are telescopically in contact with each other and each provide a hollow space for accommodating the actuating device 52 formed as second shaft 58. The actuating device 52 formed as second shaft 58 is coupled to the manipulator 50 and to an actuator 70 by a cardanic-type joint.

The actuator 70 is positioned non-rotatingly on the upper suspension 43. The actuating device 52 formed as second shaft 58 can be rotatingly moved by the actuator 70, whereby the clamping jaws 62 and 64 of the manipulator 50 are moved for gripping or releasing articles.

According to the method according to the invention, the second shaft 58, which serves for closing and opening the clamping jaws 62 and 64 of the manipulator 50 or, as applicable, of the gripper, has to perform a compensatory movement when the gripper or manipulator 50 is rotated by actuation of the first shaft 54. This compensatory movement is carried out as a relative movement in relation to the first shaft 54 in same sense (parallel) rotation, in counter rotation, or synchronously. The direction of the compensatory movement is to be carried out according to the desired mode of operation. If the clamping jaws 62 and 64 are closed, for example, by a counterclockwise rotary movement of the second shaft 58, and the manipulator 50 or, as applicable, the gripper is simultaneously rotated counterclockwise by rotation of the first shaft 54, then the second shaft 58 likewise has to perform a counterclockwise rotation, when the manipulator 50 rotates, in order to prevent an opening of the clamping jaws 62 and 64. A clockwise rotation is to be realized accordingly. The required rotation directions of the shafts 54 and 58 depend on the technical realization of carrying out the rotary movement of the second shaft 58 in a linear movement of the clamping jaws 62 and 64.

The schematic detailed view of FIG. 34 illustrates a lower part of the apparatus 41 or of the delta kinematic robot 42 from FIG. 33, as applicable, and in this context, in particular, shows in detail an embodiment of the manipulator 50 as it can be provided and used for the method according to the invention and, in particular, for carrying out the method according to the invention.

For gripping articles, the clamping jaws 62 and 64 have a plurality of flexible contact elements 59 on the side facing toward the in each case oppositely located clamping jaw 62 or 64, as applicable. The flexible contact elements 59 are brought into abutment in a force-impinged manner on the particular articles by an advance movement of the clamping jaws 62 and 64, and they fasten the particular articles essentially immovably to the manipulator 50.

FIG. 34 also shows once more in detail the lower arm sections 47 of the positioning arms 45 (cf. FIG. 33), which are in each case formed as linkage construction, and which are in each case in an articulated connection with the support ring 57 (or the so-called tool center point) at their lower end. As already mentioned above, the manipulator 50 can be rotated relative to the support ring 57 via the first or outer shaft 54.

The schematic cross-sectional illustration of FIG. 35 shows further details of the apparatus 41 or, as applicable, of the delta kinematic robot 42 from the exemplary embodiment according to FIGS. 33 and 34. Again discernible in FIG. 35 are the actuating device 52 formed as second shaft 58 as well as the linear guide 56 formed as first shaft 54. The second shaft 58 and the first shaft 54 have a concentric orientation and an identical axis of rotation; that is to say, they are disposed coaxially in relation to each other. A rotation of the manipulator 50 can be effected by the linear guide 56 formed as first shaft 54, in which case the axis of rotation in FIG. 35 is oriented vertically or toward the image plane.

It was already mentioned that, in the instance of rotary movements of the manipulator 50 induced by rotations of the outer, first shaft 54, compensatory movements in the same sense or in the counter sense are required from the inner, second shaft 58 in order to prevent an undesirable actuation, that is to say, opening or further closing, of the clamping jaws 62 and 64. The extent of this compensatory movement is based, on the one hand, on the kinematic linkage of the actuating drives actuated by the second shaft 58, for example, based on the transmission of the actuating drives. According to transmission, different rotation angles of the compensatory movement may be required. The compensatory movement is moreover based on the direction of rotation of the first shaft 54, which, as needed, requires a compensatory movement of the second shaft 58 in the same sense or in the counter sense if the clamping jaws 62 and 64 are intended to remain unchanged, open or closed, in the rotation of the manipulator 50.

It should be additionally noted that the operative connections of the particular shafts 54 and 58 with the manipulator 50 or for the compensatory movements and/or positioning movements for the clamping jaws 62 and 64, can also be interchanged if the appropriate mechanical conditions therefor exist in the coupling sections within the support ring 57. Thus, the outer, first shaft 54 can optionally also actuate, that is to say open and close, the clamping jaws 62 and 64, whereas the inner, further shaft 58 by all means can also be responsible or used for the rotary movements of the manipulator 50 or of the rotatable section of the apparatus 41 or of the delta kinematic robot 42.

The invention was described with reference to a preferred embodiment. However, it is conceivable for a person skilled in the art that modifications or alterations of the invention can be made without leaving the scope of protection of the following claims.

LIST OF REFERENCE CHARACTERS 1, 1a, 1b row
2, 2* piece good
3, 3a, 3b transport device
4 seizing range
5 manipulator
6 horizontal conveying device
8 bottle
9 shrink film
10 handling apparatus
12, 12-1, 12-2 layer, target layer
20 grouping module
22 clamping jaw
41 apparatus
42 robot, delta robot, delta kinematic robot, parallel kinematic robot, tripod
43 upper suspension
44 housing part
45 positioning arm
46 housing part
47 lower arm section/lower arm
48 drive
49 upper arm section, upper arm
50 manipulator
52 actuating member, actuating device
54 first shaft
56 linear guide
57 support ring
58 second shaft
59 contact element
60 base
62 clamping jaw
64 clamping jaw
70 actuator
F, Fa, Fb formation
P, Pa, P1 to P9 target position
TR transport direction
v3 transport speed
v6 speed
I, II, III clamping area

The invention claimed is:

1. A method for handling piece goods (2) moved one after another in at least one row (1), comprising:
    transporting a plurality of piece goods (2) as a closed formation (F) to a seizing range (4) of at least one manipulator (5),
    seizing at least two transported piece goods (2) in the seizing range (4) in a clamping or force-locking or form-locking manner from the closed formation (F) by clamping elements or gripping elements (22) of the at least one manipulator (5);
    spatially separating the at least two seized piece goods from subsequent piece goods (2) of the closed formation (F); and
    transferring the at least two separated piece goods (2) into a first target position (P1) or target alignment in relation to the subsequent piece goods (2),
    releasing at least one of the transferred piece goods (2) from the clamping elements or gripping elements (22) of the manipulator (5), so that it remains in the first target position (P1) or target alignment,
    subsequently transferring at least one of the at least two transferred piece goods (2), by the still or again activated clamping elements or gripping elements (22) of the manipulator (5) into a second target position (P2) or target alignment that is spaced apart from the first target position (P1) or target alignment while at least one released piece good (2) remains in the first target position (P1) or target alignment.

2. The method of claim 1, wherein the transferring of the at least two separated piece goods (2) comprises moving the at least two separated piece goods (2) in a direction parallel or diagonal to an original transport direction (TR) of the closed formation (F) and with or without overlapping rotation by a rotation angle of 90° to 270°, and the subsequent transferring of the at least one of the at least two transferred piece goods (2) comprises moving the at least one of the at least two transferred piece goods (2) in a linear direction parallel or diagonal to the original transport direction (TR) and with or without overlapping rotation by a rotation angle of 90° to 270°.

3. The method claim 1, wherein adjacent areas of the clamping elements or gripping elements (22) are selectively operated to release individual piece goods (2) in the first target positions (P1), while simultaneously maintaining seizure or clamping of at least one adjacent piece good (2) for transferring it into at least one further, second target position (P2) that is spaced apart from the first target position (P1).

4. The method as recited in claim 3, further comprising detecting or monitoring, by at least one sensor, the operation of the at least one manipulator (5).

5. The method of claim 4, wherein the at least one sensor comprises an optical sensor.

6. The method of claim 5, wherein the at least one released piece good (2) in the first target position (P1) or target alignment by being seized again by the manipulator (5).

7. The method of claim 6, wherein the transferring step comprises imparting at least one further velocity component in relation to a transport speed (v3) of the closed formation (F) to the at least two separated piece goods (2).

8. The method of claim 7, further comprising repeating the seizing, separating, transferring steps a number of times in succession, thus forming a group for a palletizable layer (12) or a partial layer of a plurality of piece goods (2).

9. The method of claim 8, wherein the subsequent transferring of at least one of the at least two transferred piece goods (2) comprises rotating the at least one of the at least two transferred piece goods (2), and
   comprises shifting at least one other of the at least two transferred piece goods (2) by the manipulator (5) or by other piece goods (2) merely by contact and not in a clamping manner.

10. The method of claim 5, wherein the optical sensor comprises a camera.

* * * * *